(12) United States Patent
Buxton et al.

(10) Patent No.: US 10,979,315 B1
(45) Date of Patent: Apr. 13, 2021

(54) MACHINE LEARNING FEEDBACK LOOP FOR MAXIMIZING EFFICIENCY IN TRANSACTION FLOW

(71) Applicant: AuctionIQ, LLC, Sandy, UT (US)

(72) Inventors: Brad B. Buxton, Sandy, UT (US); Mark W. Conklin, Park City, UT (US); Sami G. Aleiwe, Layton, UT (US); Bruce A. Hallberg, Jr., Holladay, UT (US)

(73) Assignee: AUCTIONIQ, LLC, Sandy, UT (US)

( * ) Notice: Subject to any disclaimer, the term of this patent is extended or adjusted under 35 U.S.C. 154(b) by 0 days.

(21) Appl. No.: 16/920,672

(22) Filed: Jul. 4, 2020

(51) Int. Cl.
*H04L 29/08* (2006.01)
*H04L 12/24* (2006.01)
*G06F 16/901* (2019.01)

(52) U.S. Cl.
CPC ...... *H04L 41/5009* (2013.01); *G06F 16/9027* (2019.01); *H04L 41/16* (2013.01)

(58) Field of Classification Search
CPC .......................... H04L 41/5009; H04L 41/16
See application file for complete search history.

(56) References Cited

U.S. PATENT DOCUMENTS

| | | | |
|---|---|---|---|
| 9,996,694 B2 * | 6/2018 | Sethumadhavan | ..... G06F 21/52 |
| 10,841,173 B2 * | 11/2020 | Spector | ................... H04L 47/70 |
| 2019/0205939 A1 * | 7/2019 | Lal | .......................... H04L 67/18 |

* cited by examiner

*Primary Examiner* — Adnan M Mirza
(74) *Attorney, Agent, or Firm* — Workman Nydegger

(57) ABSTRACT

A computer system includes a predictor engine, an extractor engine, and an acquirer engine. The predictor engine obtains resource data and stack ranks the data based on an expenditure amount each resource consumed. Resources are categorized into a tree structure. The predictor engine compiles a list identifying predicted performance enhancements and generates a notification detailing the list. In response determining that the predicted performance enhancements satisfy a threshold, the extractor engine generates an inventory of resources and rearranges the inventory based on the categories. The inventory is used to generate a baseline contrasting performance requirements with performance usages. The acquirer engine selects a resource to be used for a category based on the baseline, a list of potential resources, and the performance requirements. The acquirer engine generates or modifies an executable document. The computer system modifies these operations based on feedback to iteratively improve this transactional flow.

19 Claims, 29 Drawing Sheets

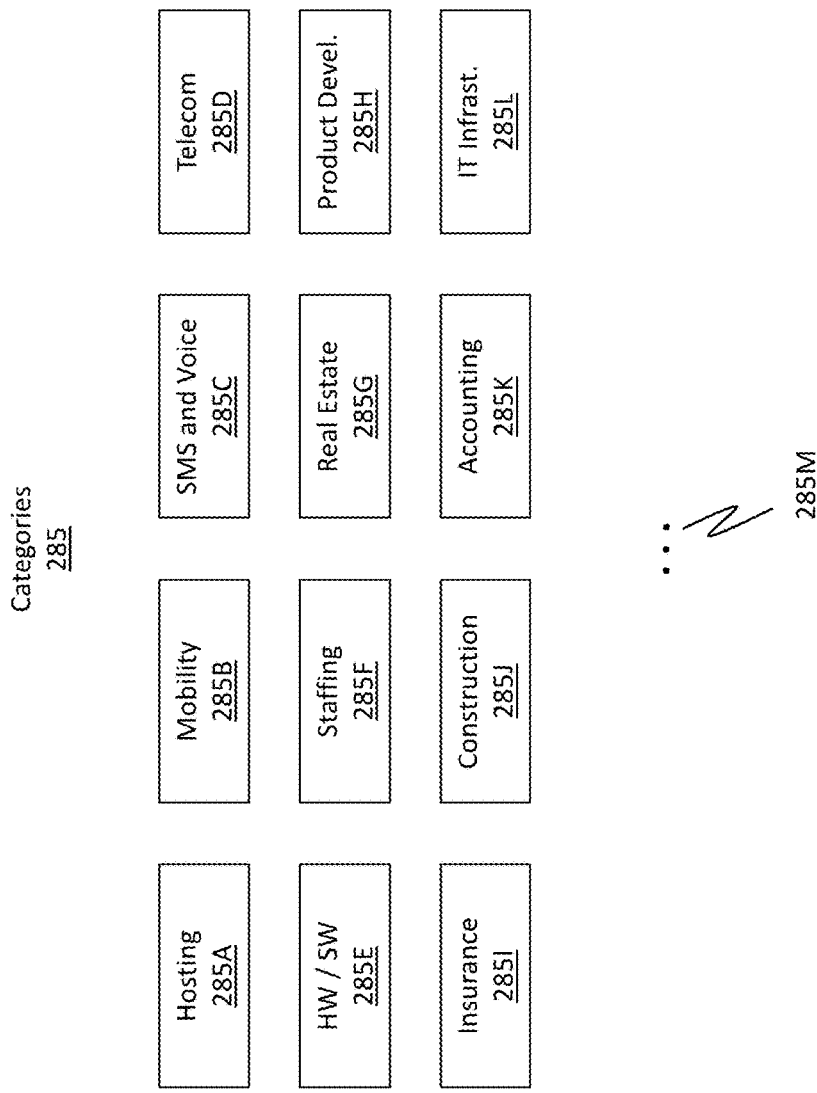

Dashboard
365

| Category | Scope | Low Prediction | High Prediction |
|---|---|---|---|
| Cloud Services | $1,123,123 | $123,879 | $250,123 |
| HW / SW | $500,542 | $12,541 | $25,213 |
| Telecom | $145,215 | $1,542 | $5,213 |
| Colocation | $321,478 | $2,546 | $6,321 |
| Hosting | $187,954 | $3,874 | $15,542 |
| IT Infrastructure | $223,145 | $8,520 | $20,457 |
| Staffing | $1,187,154 | $21,543 | $50,548 |
| Product Development | $500,874 | $11,456 | $30,215 |
| Insurance | $879,123 | $200,456 | $300,245 |
| Salesforce | $11,145 | $900 | $2,150 |
| Real Estate | $145,000 | $1,215 | $6,782 |
| Marketing | $542,210 | $62,510 | $75,154 |

*Figure 3B*

MACHINE LEARNING FEEDBACK LOOP FOR MAXIMIZING EFFICIENCY IN TRANSACTION FLOW

BACKGROUND

Companies often have personnel (e.g., buyers) available to source and buy supplies or resources from different suppliers. Sometimes, these buyers have a large amount of negotiation leverage (e.g., because they are attempting to place a large order) while other times, perhaps even a majority of times, these buyers are subject to the whims of the suppliers. To clarify, it seems as though many buyers have substantially less negotiation leverage than the suppliers, and thus those buyers are often faced with potentially abusive contract/document terms or an asymmetric and imbalanced relationship.

Another problem buyers have relates to concerns about the quality of market data. In many instances, suppliers intentionally decline to publicize their prices in an effort to skew the market in their favor. Due to this lack of accurate and detailed information, there is a substantial asymmetry or imbalance between the amount of knowledge a buyer and a supplier may have. As a consequence, buyers may never really know what is considered a "good" deal, a "moderate" deal, or a "bad" deal as compared to other buyers. Indeed, it is often the case that buyers have to rely on the knowledge of the suppliers, who have a clear interest in maintaining the highest possible margins so as to increase their own profitability. Accordingly, buyers face a serious problem in the market as a result of the asymmetry between buyers and suppliers in terms of available market knowledge.

Yet another problem is the tendency for suppliers to try to structure inflexible, rigid procurement plans with buyers. For instance, many suppliers structure their contracts in a manner so as to reduce the maneuverability of the buyer in being able to "shop" elsewhere or in being able to identify and substitute compatible units. In essence, the buyer essentially becomes hooked to a particular supplier. Releasing that hook may be so difficult that the buyers may simply continue with their current suppliers even though substantial reductions in price or increases in quality may be found elsewhere.

Yet another problem relates to the number of available suppliers a buyer may be involved with. Often, buyers cast a so-called "net" to communicate with suppliers, but that net is usually quite small and only a small number (e.g., 3-4) of suppliers end up being connected with the buyer. Using a reduced number of suppliers has the adverse effect of limiting potential opportunities to leverage suppliers against one another to obtain improved cost savings.

With that understanding, there are a number of problems currently facing the technical field. For instance, buyers (aka "clients") are often not fully aware as to what exactly they are getting themselves into when signing on with a particular supplier. Buyers often do not fully understand how much the resulting costs will actually be, and they do not fully understand the options currently available in the market. Buyers are also deficient in the amount or accuracy of information they have about what pricing is. Furthermore, buyers typically follow an impromptu, unstructured process to negotiate and generate contracts. Such problems often cause buyers to end up with only marginal or token benefits or cost savings. What is needed, therefore, is a structured program flow that can be modified over time in response to learned improvements in order to maximize or at least increase efficiency in obtaining any type of resource.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for iteratively modifying and improving how a resource is selected, where the modifications are based on feedback acquired during any number of previous iterations in which a previous resource was selected. By performing the disclosed operations, substantial benefits and advantages may be achieved due to the automated learning and dynamic process modification. As used herein, the term "resource" should be interpreted broadly to include any type of good, service, supplier of a good or service, or even computing resources, such as storage, bandwidth, processor time or cycles, and so forth.

In some embodiments, a computer system includes a predictor engine, an extractor engine, and an acquirer engine. Optionally, these different engines may be a type of machine learning algorithm or engine. The predictor engine obtains resource data describing resources that were used over a defined time period. The predictor engine then stack ranks the resource data based on an identified expenditure amount each resource consumed or was associated with. These resources are then categorized to generate a category tree data structure describing characteristics of each resource. For at least some of these categories, the predictor engine compiles a corresponding list identifying a set of predicted performance enhancements that are potentially applicable to a resource or to a category and generates a notification detailing the compiled list. This notification may be provided to a client. Subsequently, in response to a determination that the predicted performance enhancements satisfy a predetermined performance enhancement threshold, the extractor engine generates an inventory of resources that were used over another defined period of time. The extractor engine then rearranges the inventory based on the categories and uses the rearranged inventory to generate a baseline. This baseline contrasts actual performance requirements with actual performance usages for the categories. The acquirer engine, in response to a selection of a particular category, selects a particular resource to be used for that category, where this selection is based on (i) the baseline, (ii) a determined list of potential resources, and (iii) the performance requirements. The acquirer engine generates or modifies an executable document based on the selected resource. The computer system then causes the predictor engine and the extractor engine to receive feedback from the acquirer engine and performs machine learning on the feedback to modify how those engines subsequently perform their respective operations. In doing so, the system perpetually learns over time how to improve its resource selection process.

In some embodiments, an inventory is generated, where this inventory is a data structure that describes a set of resources that were used over a defined period of time. Each resource in the set is then categorized into a particular category in order to generate a category tree data structure describing characteristics of each of these resources. The inventory data structure is then rearranged based on the categories and then used to generate a baseline. This baseline contrasts performance requirements versus actual performance usage for each of the categories. Based on a selection of a particular one of the categories, a reverse auction is then initiated to select a particular resource to be used for the category. Notably, this reverse auction relies on the baseline, a determined list of potential resources, and the performance requirements. Subsequent to completion of the reverse auction, the resource is selected for use in the particular category. An executable document is then either generated or modified based on the selected particular resource. Additionally, these process operations are modified so that subsequent iterations are influenced based on feedback collected during a current iteration or a previous iteration of this transaction flow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2B illustrates some example categories into which resources may be grouped based on characteristics associated with those resources.

FIG. 3B illustrates an example dashboard whose user interface elements are specifically arranged in the dashboard so as to improve the visual display of information and to improve digestion or processing of the information.

DETAILED DESCRIPTION

Figure 1:
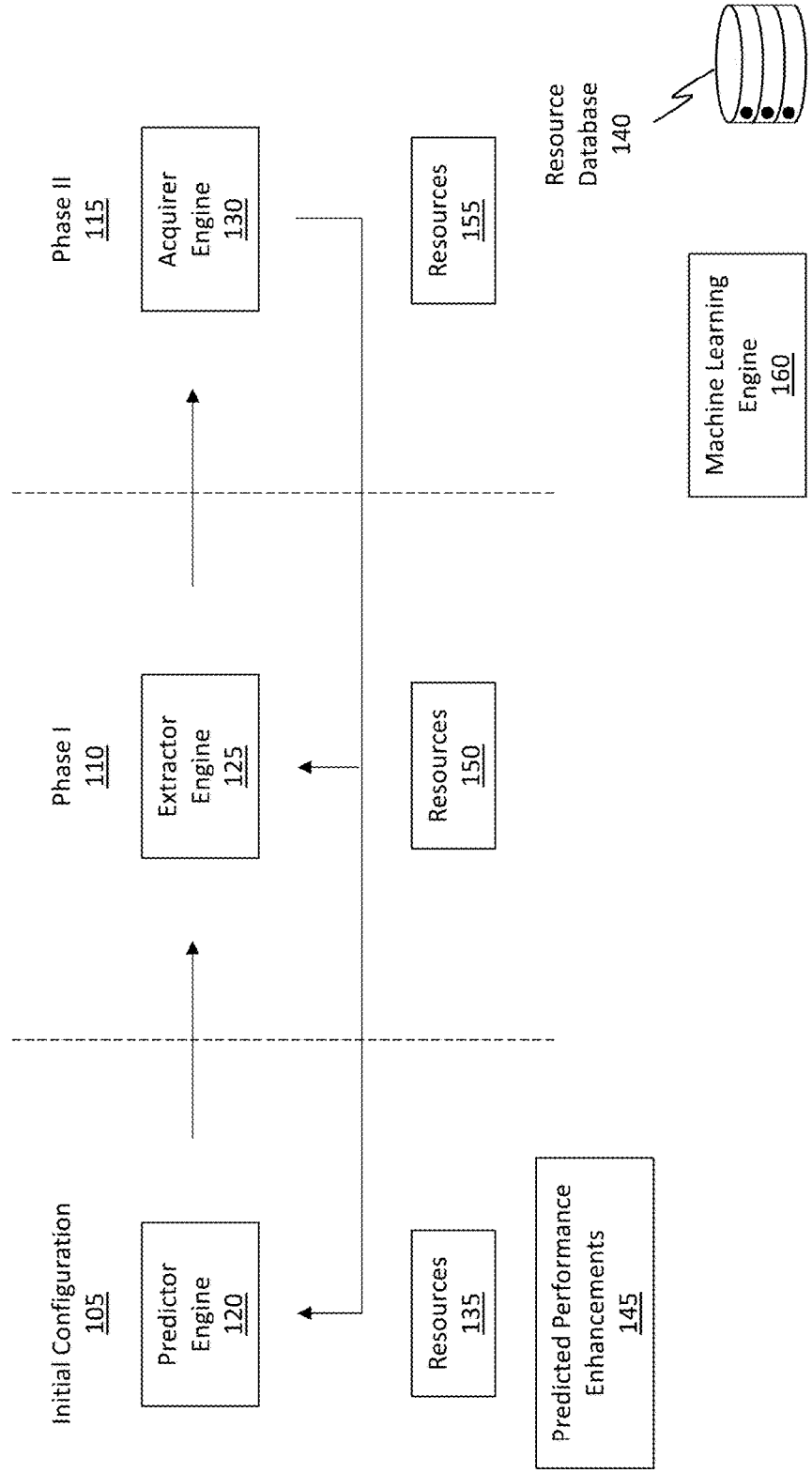
FIG. 1 illustrates an example computing architecture structured to dynamically modify how a resource is selected (i.e. the selection process constitutes a "transactional" or "transaction" flow) based on feedback acquired during one or more previous iterations in which a previous resource was selected.

Disclosed embodiments include systems, devices, and methods for iteratively modifying and improving processes for selecting resources in transaction flows. These modifications are based on feedback acquired during previous iterations in which the selection of one or more previous resource(s) is made. By performing the disclosed operations, substantial benefits and advantages may be achieved due to the automated learning and dynamic process modification. As used herein, the term "resource" should be interpreted broadly to include any type of good, service, supplier of a good or service, or even computing resources, such as storage, bandwidth, processor time or cycles, and so forth.

In some embodiments, a computer system includes a predictor engine, an extractor engine, and an acquirer engine. The predictor engine obtains resource data and then stack ranks the resource data based on an identified expenditure amount each resource consumed. Resources are then categorized to generate a category tree data structure. The predictor engine compiles a list identifying predicted performance enhancements that are potentially applicable relative to the resources and generates a notification detailing the compiled list. In response to a determination that the predicted performance enhancements satisfy a particular threshold, the extractor engine generates an inventory of resources. The extractor engine rearranges the inventory based on the categories and uses the inventory to generate a baseline, which contrasts performance requirements with actual performance usages for the categories. The acquirer engine selects a particular resource to be used for a category. This selection is based on the baseline, a determined list of potential resources, and the performance requirements. The acquirer engine generates or modifies an executable document based on the selected resource. The computer system modifies operations of these engines based on feedback so as to iteratively improve the transaction flow.

In some embodiments, an inventory is generated, where the inventory describes a set of resources that were used over a defined period of time. Each resource is categorized into a category to generate a category tree data structure. The inventory is rearranged based on the categories and then used to generate a baseline. This baseline contrasts performance requirements versus actual performance usage for each of the categories. Based on a selection of a particular category, a reverse auction is initiated to determine which resource is to be used for the category. Notably, this reverse auction relies on the baseline, a determined list of potential resources, and the performance requirements. Subsequent to completion of the reverse auction, the resource is selected for use in the category. An executable or actionable document is generated or modified based on the selected resource. These process operations are then modified so that subsequent iterations are influenced based on feedback collected during a current iteration or a previous iteration of the transactional flow.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The embodiments disclosed herein bring about substantial benefits to the technical field of "resource" selection. As will be discussed in more detail to follow, a so-called "resource" may be any type of resource, without limit. In some cases, a resource may be a supplier of a particular product, good, or service while in other cases a resource may be a computing operation, such as compute time or processor time, bandwidth, memory space, and so on. In some cases, a resource is a service or a product offered by a supplier. Accordingly, reference to the term "resource" should be interpreted broadly. The disclosed principles may be practiced in order to improve how a resource is selected for use by a client (e.g., a client computing device or a client company or entity). That is, the disclosed principles provide for methods and techniques for improving the efficiency by which a resource is selected and then subsequently used. By way of a brief example, the embodiments are able to obtain more efficient usage out of an existing resource so as to increase output of the existing resource without necessarily having to acquire additional resources (e.g., by obtaining a better contract/document deal or perhaps by obtaining additional compute time on a processor or additional bandwidth over a network). Additionally, or alternatively, the embodiments are able to substitute one resource for a different resource to achieve performance enhancements, such as cost savings, increased efficiency, and so on.

The disclosed embodiments additionally solve the problems described earlier in that the embodiments enable a client entity, buyer, or other resource requesting entity (e.g., perhaps a client computing device or a client software application) additional and more accurate information regarding the availability of resources as well as additional negotiation leverage in acquiring those resources. Whereas traditional procurement operations were often quite limited in the number of potential sources or suppliers for a resource (e.g., often only 3-4 sources were consulted or used when attempting to obtain a resource). In contrast to traditional techniques, the disclosed embodiments are able to cast a substantially wider "net" so as to involve a significantly larger number of potential sources for a resource (e.g., perhaps hundreds or thousands of potential sources). By connecting with or aggregating a larger number of potential sources, the embodiments are able to maximize competitiveness and reduce cost while also increasing performance.

The disclosed embodiments also improve the resource acquisition process through the use of smart or intelligent progressive learning. That is, the embodiments beneficially employ machine learning or automata learning to modify (i) how specific operations are performed, (ii) which sources or resources are available, and even (iii) when specific operations are to be triggered (e.g., timing elements or timing triggers). By capitalizing on machine learning, the embodiments are able to progressively refine and improve how the disclosed operations are performed.

The embodiments also beneficially place the resource requesting entities on a level footing with the suppliers to remove the previously described asymmetries or imbalances. Because a substantially larger number of potential suppliers are identified as a result of the embodiments casting a wider network or "net," the embodiments beneficially help the buyer, client, or resource requesting entity obtain additional information and negotiation leverage, thereby removing the asymmetry previously existing.

The embodiments also improve the technical field through improved automation techniques. Whereas in some cases previous buyers or clients relied on manual techniques for negotiation, the embodiments are able to provide numerous automated processes, many of which are influenced by machine learning. As a consequence, the embodiments are directly related to an improved technique for performing computational processes.

Beneficially, the embodiments can also be practically applied in a real-world scenario to thereby produce a practical application. By way of example, the embodiments not only beneficially perform efficient and robust resource selection processes, but the embodiments also practically apply those resource selection processes by generating or modifying an executable contract/document so as to secure the procurement or provisioning of those resources. To clarify, the disclosed concepts may be limited or practically applied in a meaningful and concrete manner through the generation or modification of a concrete, real-word executable document. In this regard, the process by which resources are obtained may be improved and modified based on the disclosed resource selection processes.

Accordingly, as a result of the improvements and benefits provided by the disclosed principles, buyers/clients are no longer constrained or limited in how they obtain resources. Now, the disclosed principles, when practiced, can help drive or direct a market as opposed to simply reacting to a market. Suppliers can be pushed or negotiated with to achieve level footing and to drive costs down.

Another benefit provided by the disclosed embodiments is the use of customized user interface "dashboards." As used herein, a dashboard is a user interface construct that is tailored or customized to provide selected information deemed to be relevant to a particular phase in the disclosed transactional or process flow. User interface elements provided on the dashboard are specifically arranged and structured in an effort to solve some of the problems that were discussed previously. For instance, by providing a specific visual layout for the dashboards, the embodiments are able to improve how resource data is visually displayed and are able to improve the resource selection process.

These and other benefits will be discussed in more detail later. As indicated earlier, the embodiments should not be limited to only these benefits or these scenarios. For instance, while a substantial portion of this disclosure is focused on certain types of resources (e.g., perhaps contractors, retailers, wholesale suppliers, goods, services, etc.), the principles are broadly applicable and are even applicable to a computing architecture in which a client computing device is requesting the acquisition of resources (e.g., compute, bandwidth, memory, etc.), as will be discussed in more detail later in connection with FIG. 9.

Computing Architecture for Maximizing Efficiency in Transaction Flow

Attention will now be directed to FIG. 1, which illustrates an example computing architecture 100 in which some of the disclosed principles may be practiced. Discussion regarding FIG. 1 will provide a brief overview of the disclosed principles while discussion on the remaining figures will provide a deep-dive into specific operations and principles. Accordingly, the discussion regarding FIG. 1 is provided to deliver initial context and introduction to the disclosed operations.

As shown in FIG. 1, architecture 100 may be configured to perform operations across a number of different phases or stages relative to a procurement process, or a so-called "transaction" or "transactional" flow. As used herein, "transactional flow," "transaction flow," and "procurement process" are interchangeable and generally relate to a process in which any number of potential resources are identified and one or more specific resources are selected for implementation and inclusion in an executable contract/document, purchase order, service level agreement, or any other legally operable or actionable document.

The different phases include, but may not necessarily be limited to, an initial configuration 105, phase I 110, and phase II 115. Each phase is also associated with a different so-called "engine." As used herein and as will be described in more detail later, an "engine" may refer to any type of software executable construct capable of executing defined operations, such as a function, module, or perhaps even a program thread. In some cases, the engine may be a processor, an ASIC, a GPU, any type of logical execution unit, or it may even be a machine learning algorithm. Further details on machine learning will be provided later.

As shown, a predictor engine 120 performs operations during the initial configuration 105; the extractor engine 125 performs operations during phase I 110; and the acquirer engine 130 performs operations during phase II 115. Although three separate stages and three separate engines are illustrated in FIG. 1, one should appreciate that a single engine may be used to perform operations for all three of the stages. For instance, the predictor engine 120, the extractor engine 125, and the acquirer engine 130 may all be implemented by the same processor or machine learning algorithm or, alternatively, they may be independent from one another (e.g., different threads, processors, machine learning algorithms, etc.). Transitioning from one stage to another is typically dependent on user input provided at the end of each stage, such as approval to proceed.

During the initial configuration 105, the predictor engine 120 identifies or recognizes the use of a current set of resources 135. By way of example, a telecommunications company may currently be employing the use of resources 135, which may include (without limitation) staffing members, IT infrastructure, insurance, rental properties, and so forth. These resources 135 may be identified within existing contracts, invoices, ERPs, or purchase agreements.

The predictor engine 120 receives access to the existing contracts, invoices, ERPs (enterprise resource planning), and/or purchase agreements and then extracts, parses, or segments the terms, prices, and conditions from those documents to identify specific suppliers and resources delineated in those documents. Any type of parsing or segmenting operation may be used to identify the terms, prices, and conditions. For instance, a machine learning algorithm may be trained on an initial corpus of training data to scan documents to identify terms, costs, and conditions. Another type of algorithm may be used to identify specific fields in a document. In some cases, a human user may be involved in the process. In any event, a listing of the resources 135 is generated, where the resources 135 at least include costs, supplier information, terms, and conditions (e.g., what specific good or service is the supplier providing).

Based on the type of resource being provided, the embodiments are able to classify the terms, conditions, and prices into different categories. For instance, suppose a contract exists detailing how a telecommunication company will provide phone services for the client. Here, the terms, prices, and conditions outlined in the contract may be categorized under a "telecom" category. Similarly, suppose a contract exists detailing how a janitorial service will clean an office building. Here, the terms, prices, and conditions outlined in the contract may be categorized under a "cleaning" category. Additional details on categories will be provided later. Sometimes, multiple different contracts may delineate different resources, but those resources may fall under the same category.

After extracting and aggregating the resources 135 from the various different documents (or perhaps even by conducting an audit on the client's systems to identify resources, such as software licenses used on computing devices), the predictor engine 120 consults a resource database 140 in order to generate a set of estimated or predicted performance enhancements 145 with regard to the resources 135. As used herein, reference to a "performance enhancement" may include, but is not limited to, any type of increase or improve to a resource's operational efficiency, cost (e.g., increased cost savings on the part of the client), or increase in output or volume.

The resource database 140 is an ever-growing repository of information describing different suppliers and the resources they provide. The resource database 140 may include collected reputation data describing a reputation of a supplier, such as whether the supplier is reputed as keeping their end of a contract or is reputed as delivering their resources on time and as stipulated. Any kind of reputation data may be included in the resource database 140. The resource database 140 may also include line items detailing how large of an outreach a supplier has or how active a supplier is in providing a particular resource. The resource database 140 may also list how often suppliers are willing to take on new clients or new types of work. The resource database 140 may also list geographic preferences identified in which certain suppliers seemingly prefer to operate. Insurance information, profitability information, and percentage of market share for the suppliers may also be listed in the resource database 140.

The resource database 140 may also list specific types of services or goods (e.g., "resources") that a supplier/provider may provide or is capable of providing. The resource database 140 may also list past known prices that the suppliers have used to supply those resources. In this regard, the resource database 140 lists or details any number of different characteristics of both resources and suppliers. By progressively expanding and enlarging this resource database 140, the embodiments are able to provide more robust and detailed information about suppliers and are able to involve a potentially larger number of suppliers when acquiring a resource.

Accordingly, the predictor engine 120 consults, queries, or pings the resource database 140 to compare and contrast the terms and conditions identified in the client's contracts, invoices, ERPs, and purchase agreements against the known availability and pricing metrics recorded in the resource database 140. Based on these comparisons, the predictor engine 120 then generates an initial set of predicted performance enhancements 145. These predicted performance enhancements 145 identify specific resources that may be modified or "disrupted" (e.g., substituted with a resource provided by a different supplier or perhaps renegotiated with the current supplier for a modified price) in order to achieve modified terms. By "disruption," it is generally meant that some change with regard to the resource is to occur. As indicated above, such disruptive changes may include new terms, conditions, prices, or volume, or may include new suppliers and/or substitute resources provided by different suppliers. By way of additional clarification, the predicted performance enhancements 145 identify areas where the resources 135 may be potentially modified in order to potentially achieve additional cost savings and/or other types of improved performance measurements (improved efficiencies, increased volumes, etc.).

These predictions are based on a comparison of the current prices against those listed in the resource database 140. This comparison can help identify areas or resources where a current client is paying too high of a price for a particular resource when it is known by the resource database 140 that a lower price may be achieved in the market.

Once the predicted performance enhancements 145 are generated, then those performance enhancements may be compared against a threshold to determine whether the potential cost savings is worthwhile to pursue. If the threshold is satisfied by the potential cost savings, then phase I 110 may begin. As will be described in more detail later, the threshold may be a particular dollar amount of savings, a percentage amount of savings, or some other threshold with regard to a performance enhancement or increase as compared to current performance measurements.

Whereas in the initial configuration 105, the predictor engine 120 used perhaps only a sampling of resource data spanning only a limited time period, the extractor engine 125 in phase I 110 performs a more comprehensive and invasive examination of resources 150 currently being consumed or used by a client. Some of resources 150 may be the same as the resources 135 identified during the initial configuration 105. The examination may reach back in time longer than the time queried by the predictor engine 120. Additionally, the extractor engine 125 may acquire or be provided relatively more access to client documents as compared to the predictor engine 120. In some cases, the initial configuration 105 can be viewed as a so-called "pre-engagement" phase.

In any event, the extractor engine 125 analyzes the contracts, invoices, purchase agreements, ERPs, and any other supply-chain based document to identify which resources 150 are currently being consumed by the client. Sometimes, network or computer auditing may also be performed to identify resources. Similar to the predictor engine 120, the extractor engine 125 may also use any type of machine learning or other algorithm to perform this extraction, segmentation, or parse process.

The different resources 150 are then grouped or organized into different "categories" based on their respectively determined types, as introduced earlier. If a resource has already been identified and categorized, then that resource may be skipped or perhaps re-evaluated and potentially re-assigned. Whereas the categorization process performed by the predictor engine 120 may have been a quick and/or rudimentary triage-like categorization, the categorization process performed by the extractor engine 125 is more in-depth, detailed, and widespread in that relatively more documents are analyzed such that relatively more resources are identified and made available for categorization.

The extractor engine 125 is also able to compare the results of its compilation against the data included in the resource database 140. Additionally, the extractor engine 125 may group the resources 150 into the different categories and list the identified categories and/or resources 150 in a dashboard for review. In some cases, a list of categories and/or resources may be compiled, where the list is organized or sorted based on a predicted amount of potential costs savings according to category and/or individual resource. Additional details on these features will be provided later.

The list is then made available for review by the client. Based on this review, a particular category of resources and/or a particular resource may be identified as being a category or resource that the client would like to obtain a better price on or would like to obtain performance enhancements. Accordingly, phase II 115 is triggered based on this selection.

During phase II 115, the embodiments perform a resource selection process which is performed in an attempt to obtain costs savings or performance enhancements for the client by either selecting a resource from a new supplier or by commanding a better price from the existing supplier. Multiple new resources may be selected, or a single resource may be selected. In some cases, the embodiments employ or make use of a reverse auction to select particular resources 155 for replacement of the existing resources 150 or for modification of those resources to provide the client with cost savings or performance enhancements.

In preparation for the reverse auction, the embodiments generate a baseline, which details the current metrics of the current resources, generate a list of resources or suppliers who may participate in the reverse auction, and generate a set of IQ sets, which explicitly outline the terms and conditions that must be satisfied in order to win the bid of the reverse auction. The suppliers then compete against one another in the reverse auction in an effort to obtain the winning bid.

Whereas traditional auctions result in an increase to a price of a good, a reverse auction actually results in a decrease to a price of a good. A base price is set and the suppliers are tasked with underbidding one another until a lowest price wins the auction. It should be noted that the winner of the reverse auction may not necessarily be selected as the supplier who will now furnish the resource, but rather the winner (and potentially a selected number of other suppliers, such as perhaps the top three) is selected as a "candidate" to potentially provide the resource at the auctioned bid price. The supplier will not legally or officially become the supplier until such time as a contract is executed, which will be discussed in more detail later.

Feedback from each of these stages (e.g., the initial configuration 105, phase I 110, and phase II 115) may be fed into each of the different engines so as to modify how they subsequently perform their respective processes. Additionally, as shown by machine learning engine 160, any one or multiples of these engines may be implemented using machine learning. By performing the disclosed operations, the transactional flow may be modified and refined over time and the information on potential suppliers and resources in the resource database 140 may perpetually grow. Accordingly, the disclosed embodiments provide substantial benefits to clients attempting to provision resources, regardless of whether the client is a company, a human, or even a computer system (e.g., attempting to obtain increased compute, memory, bandwidth, etc.).

As used herein, reference to any type of machine learning may include any type of machine learning algorithm or device, automata learning, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Generally, automata learning is a type of machine learning technique in which a current process or action is performed based on a set of previous actions or experiences that were performed. In some cases, automata learning is a type of reinforcement learning and is based on various different states or statuses of data.

Regarding learning from feedback, by way of a brief example, the feedback may modify how either one of the predictor engine 120 or the extractor engine 125 segments or parses data from a document. For instance, new key words may be added to a key word database to act as flags for identifying when a term, condition, or price is being mentioned in the document. Modifications may also be made to optical character recognition performed on those documents to enable a scan to be performed on unstructured documents, such as perhaps some types of pdfs, camera images, and so forth. Modifications may also be made to the thresholds that are used to determine whether or not a purported or predicted performance enhancement is sufficient to proceed with the subsequent steps. Modifications may also be made to the timing elements, such as how far back to search for documents in the initial configuration 105 or phase I 110. Additional modifications will be discussed later, where those modifications are performed as a result of the feedback loop discussed herein, which feedback loop is provided in an effort to iteratively improve each step in the transactional flow.

With that introduction, the remaining figures will be used to discuss in detail various aspects of each of the recited stages. Some additional figures will also be used to discuss some other aspects of the disclosed embodiments.

Initial Configuration—High Level Assessment

Figure 2A:
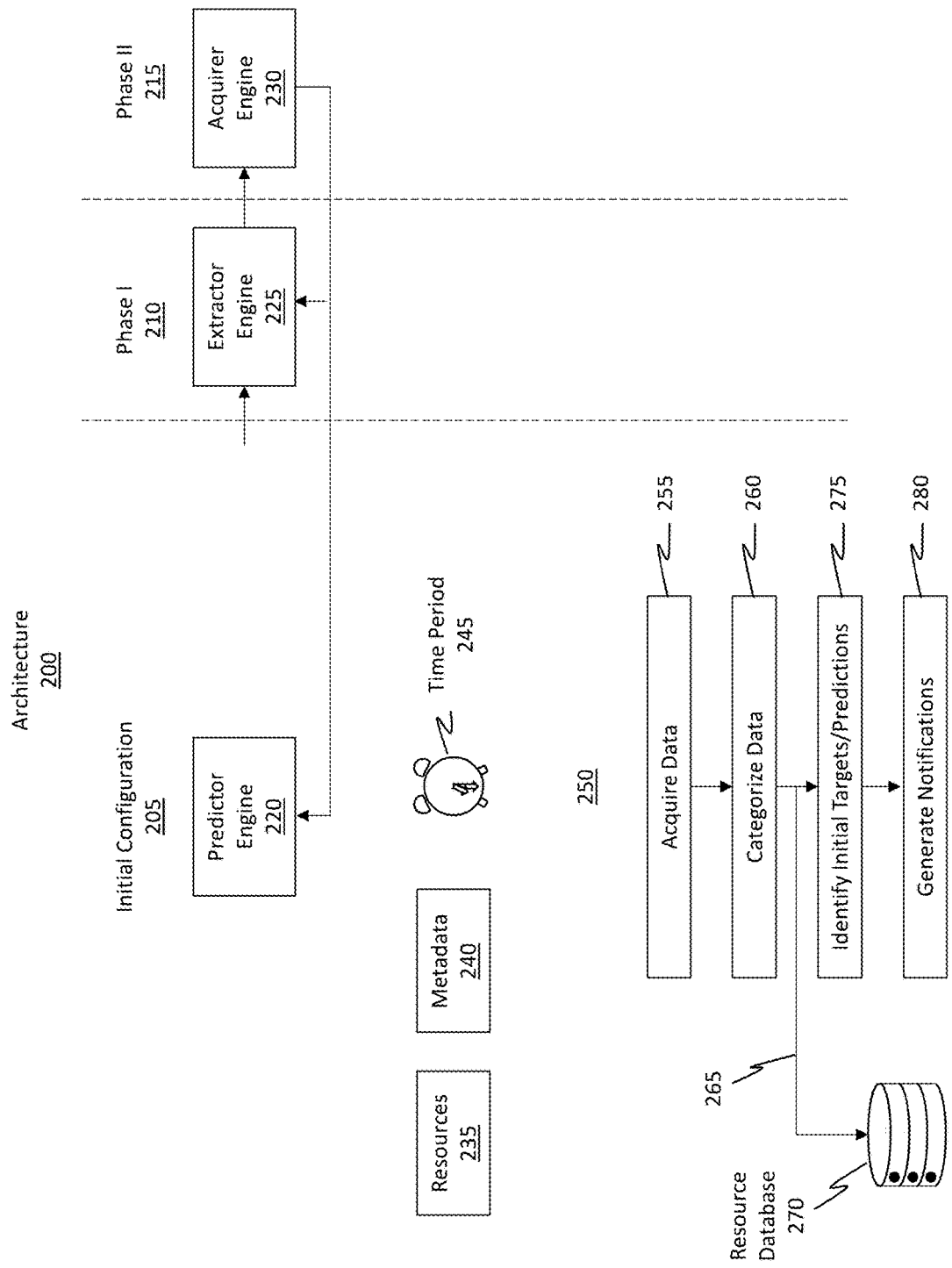
FIG. 2A illustrates details regarding some of the operations that may be performed during an initiation configuration stage of the transactional flow.

FIG. 2A shows an example architecture 200, which is representative of architecture 100 of FIG. 1. For instance, architecture 200 is shown as including engines that are triggered in response to the initiation of different stages, which include an initial configuration 205, phase I 210, and phase II 215, each of which corresponds to the related stages discussed in FIG. 1. Additionally, architecture 200 includes a predictor engine 220, an extractor engine 225, and an acquirer engine 230, again each of which corresponds to the related engines discussed in FIG. 1.

FIG. 2A is specifically focused on aspects related to the initial configuration 205. During this initial configuration 205, the predictor engine 220 generates a prediction for a client detailing what potential savings or other performance enhancements may be realized by modifying or disrupting the client's current resource usage or procurement process to obtain services/goods. In other words, the predictor engine 220 provides a so-called "high-level assessment" detailing potential improved efficiencies in cost, improvements in quality, or any other performance enhancement.

Initially, the predictor engine 220 is provided access to the client's existing resources 235, which are outlined or detailed in any number of contracts, invoices, ERPs, purchase agreements, and so forth. Such access may be provided in any number of ways. For instance, as will be discussed later in connection with FIG. 2D, the documents (e.g., contracts, invoices, purchase agreements, etc.) may be uploaded to a client portal for the predictor engine 220 to gain access. Additionally, or alternatively, the predictor engine 220 may be granted permission to reach across a network (e.g., perhaps via a virtual private network (VPN) or some other port) to gain direct access to the client's resources 235 disclosed in the documents. In addition to access to documents, the predictor engine 220 may also be granted permissions to network computing resources directly to identify specific computing resources that are currently in use by the client. In some cases, an auditing function may be executed by the predictor engine 220 on the client to identify which resources the client is currently consuming. Accordingly, any type of access may be provided to the predictor engine 220 to identify the resources 235.

In addition to identifying the resources 235, the predictor engine 220 may also compile and collect any amount of metadata 240 describing how the resources 235 are currently being consumed. Such metadata 240 may include, but is not limited to, a time duration in which the resources 235 have been used, supplier information related to the resources 235, cost metrics associated with the resources 235, expiration dates detailing when the resources 235 are up for renewal or when the resources 235 will expire, client-side principal or responsible manager information detailing which manager purchased the resources 235, a number of licenses the resources 235 have, and so forth. Indeed, any type or amount of metadata 240 may be collected. Similar to how the resources 235 may be extracted and identified from documents, the metadata 240 may also be extracted and identified from the same or additional documents.

During this initial configuration 205, the predictor engine 220 may be limited or refrained from aggressively examining all of the client's documentation. For instance, the predictor engine 220 may have imposed limits on a time period 245 regarding which documents are available for inspection. By way of example, the time period 245 may be set to a number of months extending backward in time, such as 6 months, 9 months, 12 months, or perhaps even 15 months. Documents that are considered to be alive or active (i.e. those documents have not expired or are irrelevant based on document execution date and/or document expiration date, which may be identified during the search process) may be available while documents that are older than the time period 245 may not be available. By way of example, suppose a first document is considered "alive" during the time period 245 as a result of the document's expiration not occurring until some point in time in the future. This document may be available for consumption or examination during the initial configuration 205. In contrast, suppose a second document is considered "expired" during the time period 245 as a result of the document's expiration occurring prior in time to the time period 245 (e.g., suppose the time period 245 extends back 12 months, but the document expired 13 months ago). In some cases, the document may be considered alive based on its metadata. Accordingly, resources identified within a document may be identified and/or selected based on metadata associated with those resources (i.e. with the document). This metadata may indicate that a particular resource was used within the defined period of time.

The embodiments may initially identify the expired document as being a potential candidate for inspection, but may then identify that the document is expired. In response to this determination, the embodiments may refrain from further examining this document and may tag the document's metadata with an indication that it should be skipped from further examination during the initial configuration 205. Accordingly, the predictor engine 220 may have limited search capabilities based at least on a defined time period 245.

FIG. 2A then shows a flowchart of an example method 250 for performing the initial configuration 205. Initially, method 250 includes an act (act 255) of acquiring data in the manner described above. In some cases, the acquired data may be stack ranked based on an identified expenditure amount (e.g., cost) each resource consumed. For instance, insurance costs will likely be higher than office supply costs. As a consequence, the stack ranking process will list the insurance resources higher in the ranked list as compared to the office supplies resources. In some embodiments, prior to stack ranking the data or as a part of the stack ranking process, a pivot is run on the data to generate an initial pivot table describing the data.

Subsequently, method 250 includes an act (act 260) of categorizing the data into different categories. In some embodiments, the stack ranking process mentioned earlier is performed based on category, such that the categorization process occurs before stack ranking and such that the compiled categories are ranked against one another based on total costs associated with each category (i.e. the summation of costs for each resource assigned to a category). Any number of different resources may be assigned to the same category. The ranking process may, therefore, be based on the combined total of costs associated with all of the resources assigned to a particular category. FIG. 2B provides some additional details regarding what is meant by "categories."

In particular, FIG. 2B shows a listing of optional categories 285 that a resource (e.g., resource 235 from FIG. 2A may be assigned). Some example categories 285 include, but are not limited to, hosting 285A, mobility 285B, short message service (SMS) and voice 285C, telecom 285D, hardware/software (HW/SW) 285E, staffing 285F, real estate 285G, product development 285H, insurance 285I, construction 285J, accounting 285K, and IT infrastructure 285L. The ellipsis 285M demonstrates how any number of categories may be included in categories 285. Indeed, hundreds or perhaps even thousands of categories may be used. These are example categories that are identified based on characteristics of a resource.

As used herein, the term "category" generally refers to a determined "type" of service or good that a resource generally has, or rather, refers to the general characterization of a service or good. For instance, an office telephone account provided by a telecommunications service will likely be categorized in the telecom 285D category. Similarly, a desktop or laptop will likely be placed in the HW/SW 285E category. As another example, malpractice insurance will be grouped in the insurance 285I category. Each resource (e.g., resources 235) may be analyzed to determine its respective type or classification, which is determined based on the characteristics associated with that resource. In some cases, a human user may assign the resource to a category while in other cases an automated service (e.g., machine learning) may automatically and without human intervention assign a resource to a category. A machine learning algorithm may be trained to identify and assign resources to categories based on descriptions pulled or extracted from the client's documents or perhaps even based on an automated search about the resource using the Internet.

Assigning resources to categories is particularly beneficial to assist in the process of identifying which practices or which endeavors a client is generally engaged in. That is, the combination of the client's assigned categories helps paint a picture or tell a story regarding what operations the client is performing. In this regard, the categories help simplify or compress the description regarding the business practices of the client. Additionally, as will be described later, the categories are highly beneficial in that they help identify specific aspects of the client's business that may be benefitted from cost savings or other performance enhancements.

Figure 2C:
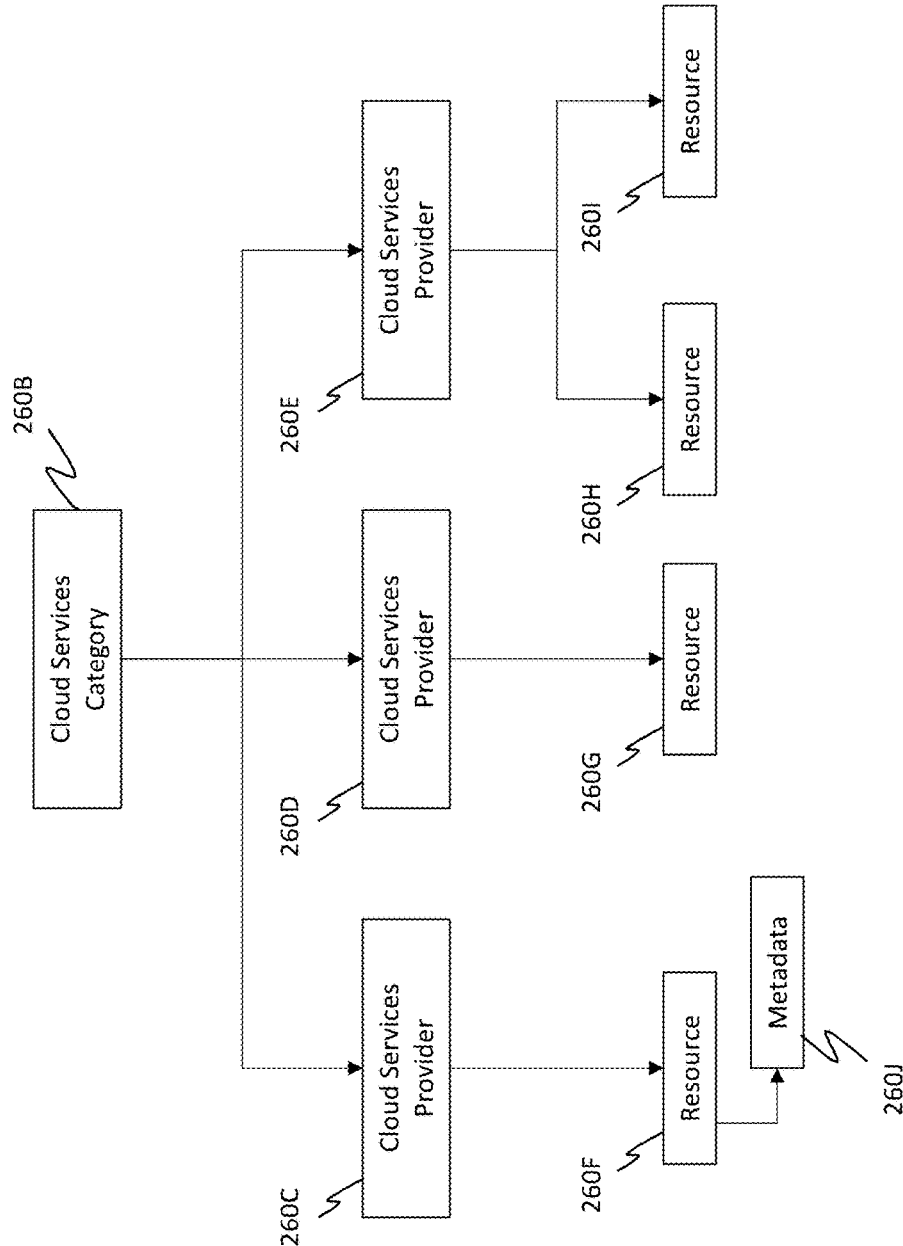
FIG. 2C illustrates an example category tree data structure.

Turning briefly to FIG. 2C, there is shown an example of a category tree data structure 260A, which may be generated as a part of method act 260 in FIG. 2A and which may be based on the categories 285 of FIG. 2B. The category tree data structure 260A illustrates a structured hierarchical tree that organizes data into different tree nodes based on category. For instance, category tree data structure 260A is shown as including an example cloud services category 260B as a top parent node in the tree. A scan of the client's documents may have discovered that the client is currently consuming a cloud service resource. As a consequence, the client may now be associated with the cloud services category 260B.

Delving or scanning deeper into the client's documents may identify different subcategories or subclasses with regard to the client's use of cloud services. For instance, suppose the client is contracted with three different cloud service providers. These three providers or suppliers may be listed in the tree as cloud services providers 260C, 260D, and 260E. Each one of the cloud service providers may be providing a different type of cloud service (e.g., perhaps SAAS services, PAAS services, or IAAS services).

For instance, the tree shows how cloud services provider 260C is providing a resource 260F; cloud service provider 260D is providing a resource 260G; and cloud service provider 260E is providing resources 260H and 260I. In some cases, the tree may also include additional metadata (e.g., metadata 260J) about a particular resource, provider, or category. Accordingly, by structuring the collected and parsed data into a tree data structure, the embodiments able to identify correlations between different aspects of resources and categories.

Returning to FIG. 2A, after categorizing the data in act 260, the method 250 may include an act (act 265) of updating the resource database 270, which is representative of the resource database 140 from FIG. 1. Such updates may be triggered upon detection of a new supplier or a new resource that is not currently listed in the resource database 270. For instance, upon identifying a resource or supplier within the resource database 270, the embodiments may submit a query to the resource database 270 to determine whether the resource or the supplier is already listed in the resource database 270. If it is already listed, then no updates will occur. On the other hand, if it is not already listed, then the resource database 270 may be updated to include new data describing the resource or supplier as well as any metadata identified from the client's documents pertaining to that resource or supplier (e.g., supplier name and information, cost metrics, etc.) as well as any additional information obtained over an automated Internet search. In at least this manner, therefore, the resource database 270 may be periodically updated to include new information.

Method 250 then includes an act (act 275) of identifying initial targets or so-called "predictions" regarding where potential cost savings or other performance enhancements may be realized. In some cases, the predictions may be focused on an entire category, which may include the compilation of multiple different resources such that the category as a whole may be benefitted by cost savings by reducing expenses associated with multiple resources. In other cases, the predictions may be focused on a specific resource, which is identified as being a candidate for potential cost savings. For brevity purposes, the remaining disclosure will frequently (though not exclusively) focus on "cost savings," but it will be appreciated that any type of performance enhancement (as described herein) may be achieved by the disclosed operations.

The predictions may indicate a specific dollar amount that may be saved, a range of dollar amounts that may be saved (e.g., an estimated minimum savings and/or an estimated maximum savings), a specific percentage amount that may be saved, or even a range of percentage amounts that may be saved. Accordingly, the predicted performance enhancements identified (e.g., perhaps in a compiled list) may include one or more of a predicted minimum performance enhancement, a predicted maximum performance enhancement, or even an average performance enhancement based on historical data collected for at least some of the categories (e.g., historical average savings based on previous iterations of the disclosed principles). In some embodiments, these number values may be visually displayed in a dashboard, which is specifically structured to enable ready comparison between different categories, costs, resources, and predictions. Additional details regarding dashboards will be provided later in connection with FIG. 3B.

The predictions may be based on past learned experiences in which previous categories and resources have been operated on in an attempt to reduce costs and provide performance enhancements. As described herein, the embodiments utilize a so-called feedback look to enable machine learning to occur throughout the different stages so as to repeatedly refine and improve the various processes, including this initial prediction process.

In some embodiments, method 250 additionally includes an act (not shown in FIG. 2A, but this act will be shown later) of compiling a corresponding list for each of at least some of the categories. This compiled list identifies the predicted performance enhancements (e.g., the potential cost savings) that are potentially applicable to each resource in the list's corresponding category. This list may also be visually displayed in the dashboard.

Method 250 then includes an act (act 280) of generating a notification, alert, or message detailing the compiled list. This notification may be provided to the client for review in order to select a specific category and/or resource or perhaps even multiple categories and/or multiple resources on which to focus on in order to attempt to realize the predicted performance enhancements (e.g., cost savings). That is, the client is able to provide user input regarding which specific performance enhancing endeavors are to be focused on at this specific time. Of course, the client can asynchronously submit additional requests at any time, as will be discussed in more detail with the so-called "ad-hoc requests."

Figure 2D:
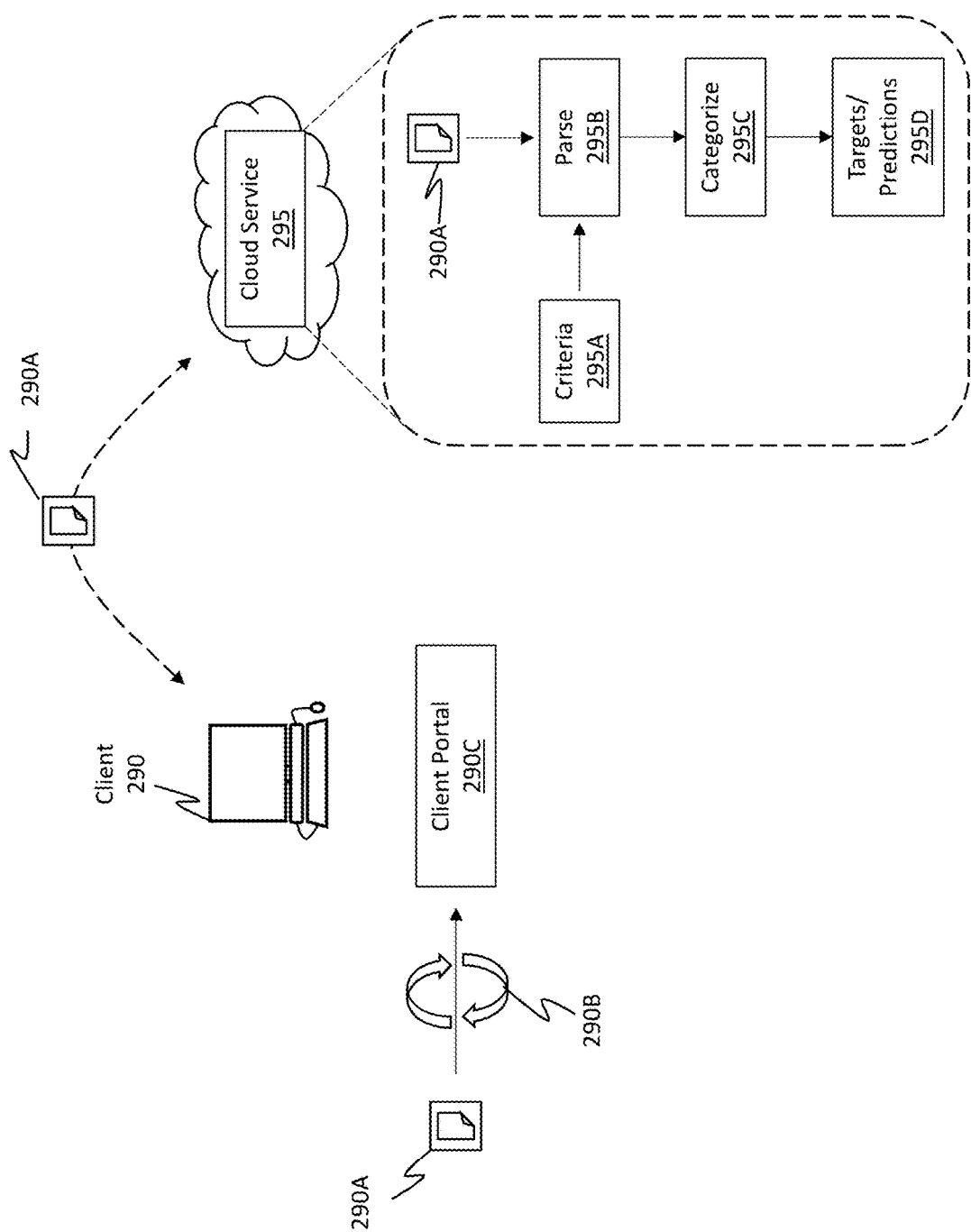
FIG. 2D illustrates an example technique for enabling a cloud service to gain access to a client's documentation and current resources.

Attention will now be directed to FIG. 2D, which provides some additional information regarding the initial configuration 205 stage illustrated in FIG. 2A. Here, there is shown a client 290, which is representative of the clients discussed thus far, and a cloud service 295. In accordance with the disclosed principles, the cloud service 295 may represent the different engines that have been discussed thus far. As discussed earlier, the cloud service 295 (e.g., the predictor engine 220) may submit a request to receive data from the client 290. The client 290, therefore, responds to the request by submitting data 290A in the manners discussed earlier (e.g., perhaps by way of a VPN, portal, and so forth). Here, data 290A is representative of the data discussed in method act 255 of FIG. 2A. In the visualization provided by FIG. 2D, the client 290 is (potentially on a periodic basis 290B) submitting the data 290A via a client portal 290C, which is granting access to the cloud service 295 to obtain or gain access to the data 290A.

The cloud service 295 then operates on the data 290A in the manner described earlier. For instance, a set of rules or criteria 295A may be used to determine how to parse 295B the data 290A to identify the resources and suppliers within the data. To clarify, the criteria 295A may be any type of machine learning or filtering requirements that are used to filter resource and supplier data from non-resource and non-supplier data. For instance, many contracts have lengthy amounts of boilerplate material contained therein. That boilerplate information is not relevant or pertinent with regard to cost savings, so the embodiments are able to separate or filter that information from the data 290A using the criteria 295A. Subsequent to parsing the data 290A, the embodiments categorize 295C the data and then identify the targets/predictions 295D, as discussed earlier.

Accordingly, numerous techniques may be used to provide data to the cloud service 295, which may include the recited predictor engine 220, the extractor engine 225, and the acquirer engine 230 from FIG. 2A. Additionally, any defined criteria may be used to facilitate the parsing process to separate relevant cost-related and supplier-related data from the contracts, invoices, purchase orders, ERPs, and so forth. These processes are performed to beneficially generate an initial set of predictions that will help the client determine whether or not to proceed with the subsequent stages in the transactional flow. Accordingly, if client input provides approval to proceed, phase I will then be triggered.

Phase I—Detailed Level Assessment

Figure 3A:
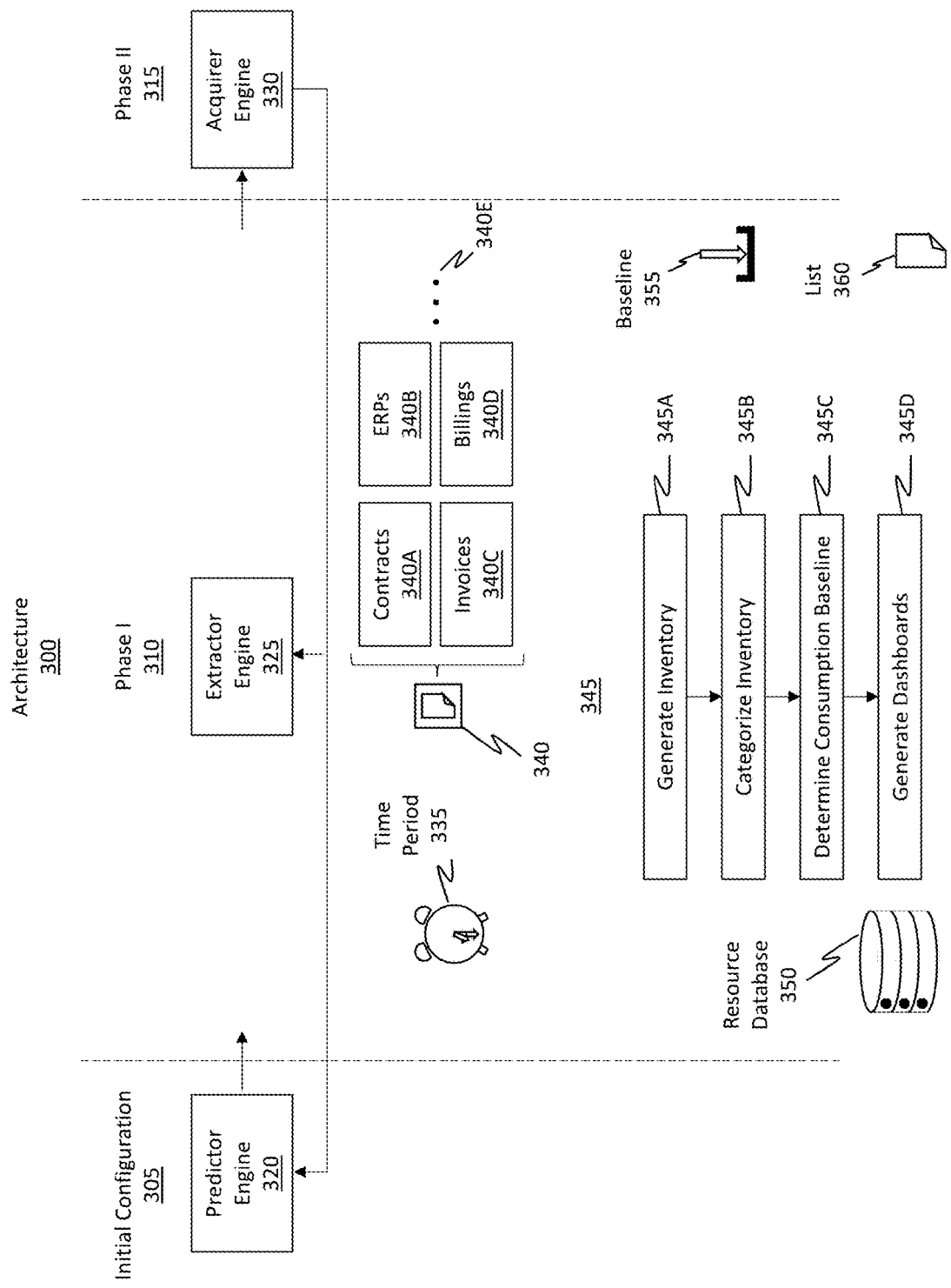
FIG. 3A illustrates details regarding some of the operations that may be performed during a phase I stage of the transactional flow.

FIG. 3A shows an example architecture 300, which is representative of the architectures discussed thus far. For instance, FIG. 3A shows three separate stages, including the initial configuration 305, phase I 310, phase II 315, as well as a predictor engine 320, an extractor engine 325, and an acquirer engine 330. Each of these phases and engines is representative of the phases and engines discussed previously. Additionally, FIG. 3A is primarily focused on operations performed during phase I 310.

Phase I 310 commences subsequent to the completion of the initial configuration 305 and is triggered in response to the client input described earlier. To clarify, phase I 310 is triggered based on a determination that the predicted performance enhancements calculated during the initial configuration satisfy a predetermined performance enhancement threshold (e.g., the predicted cost savings are sufficient to justify with proceeding forward). In some cases, the threshold may be a specific dollar amount that will be saved while in other cases the threshold is a relative percentage amount that will be saved.

During phase I 310, the embodiments perform a deep-dive into the client's available documents. For instance, whereas the time period 245 from FIG. 2A was limited, the time period 335 in FIG. 3A is substantially longer and may span a duration of multiple years. To clarify, whereas the scan for documents during the initial configuration was limited to reaching back in time only a determined number of months, the scan for documents during phase I 310 is able to reach back in time any number of specified years. The scanning process is generally the same as was performed during initial configuration with the exception that fewer restrictions are placed on the scan. Now, the embodiments are able to search for any type of data 340, which may include contracts 340A, ERPs 340B, invoices 340C, and billings 340D (e.g., any type of billing document). The ellipsis 340E demonstrates how other types of documents, services, goods, or provisions may be searched for as well, without limit.

FIG. 3A also illustrates a flowchart of an example method 345 for performing operations during phase I 310. Method 345 may be performed by the extractor engine 325, which itself may be any type of machine learning algorithm.

Based on the results of scanning for the data 340, method 345 includes an act (act 345A) of generating an inventory describing a set of resources (e.g., resources collected and extracted or segmented from the data 340) that were used or consumed over the time period 335. In this regard, the embodiments digest the client's contracts, invoices, purchase orders, etc. in order to build an inventory detailing, at a granular level, the resources that were consumed by the client. The inventory may be generated by any type of machine learning disclosed earlier. This inventory provides a structured representation of the client's resources and summarizes which resources were provided by which suppliers during which time periods. The inventory may also list when the resources will expire or will be renewed (e.g., term, termination, renewal, or any other type of actionable data). In some cases, the inventory may be structured using a hierarchical tree data structure as described earlier.

Then, method 345 includes an act (act 345B) of categorizing the inventory to place or assign the listed inventory items into respective categories based on a determined type associated with each resource/inventory item. Such a process is similar to the categorization process mentioned earlier, with the primary difference being that a substantially larger amount of information will be categorized. Similarly, any of the categories mentioned in connection with FIG. 2B may be used or any new categories may be used. The inventory may then be rearranged or reorganized based on the assigned categories so that like-resources are grouped with like-resources within the inventory (as opposed to being listed at different locations within the inventory).

As new resources or suppliers are identified during the scanning or inventory process, the resource database 350, which is representative of the resource databases discussed thus far, may be updated to reflect the new information. The resource database may detail characteristics regarding any of the disclosed resources throughout any of the disclosed stages.

Method 345 then includes an act (act 345C) of determining a consumption "baseline." To clarify, the rearranged inventory is then used to generate the baseline, which contrasts performance requirements versus actual performance usage for each of the categories.

By way of example, suppose the client is over-purchasing office supplies such that the client now has a surplus of supplies and is now required to warehouse that surplus in storage (thus increasing costs). In accordance with the disclosed principles, the embodiments are able to determine the performance requirements of the client using client input, market data of other clients' needs, past performance history, identification of the use of storage for the surplus (i.e. identification of additional costs to support a particular resource), and so forth. The embodiments are then able to compare the performance requirements against what is actually being spent or consumed (i.e. the actual performance usage or consumption). This comparison is beneficially listed in the consumption baseline to identify areas of consumption or areas of cost that are disproportionate to actual needs or requirements. Baseline 355 in FIG. 3A symbolically represents this consumption baseline. In some cases, baseline 355 also includes predictions regarding potential performance enhancements that may be achieved by disrupting these resources.

Optionally, method 345 then includes an act (act 345D) of generating dashboards to reflect the information generated and acquired during execution of method 345. The dashboards may include any number of lists (e.g., list 360), which may visually illustrate resources, categories, or even the baseline analysis. FIG. 3B is an example of one type of dashboard that may be generated and visually displayed. Notably, the elements included in the dashboard are specifically structured in an effort to solve the problems discussed earlier and are specifically designed to provide summary views of selected information.

For instance, turning now to FIG. 3B, there is shown an example dashboard 365, which may be generated as a result of performing method act 345D from FIG. 3A. Dashboard 365 is shown as listing a number of different assigned categories (e.g., Cloud Services, HW/SW, etc.) along with the total cost or scope associated with each category (i.e. as a whole, how much are the resources assigned to that category costing the client).

By way of example, this client is currently spending $1,123,123 on cloud services; $500,542 on HW/SW; $145,215 on telecom services; and so forth. Within each category, there may be any number of different service providers providing a resource that has been categorized to belong with that category. For instance, within the cloud services category, the client may be paying for 1, 2, 3, 4, 5 or more than 5 different cloud service providers (e.g., AWS, Azure, etc.). Additionally, the specific service or resource each provider may be providing may be somewhat different, even though the resources have all been categorized under the same heading or category. By way of example, AWS may be providing SAAS services while Azure may be providing IAAS services or even PAAS services.

Dashboard 365 then lists an estimated low prediction of potential cost savings (or other performance enhancements) and an estimated high prediction of potential cost savings. For instance, for the cloud services category, the embodiments have estimated that, as a low amount, $123,879 may be saved by disrupting the current services (e.g., by negotiating new deals or by hiring a new supplier or by obtaining new resources). On the other hand, the embodiments have estimated that, as a high amount, $250,123 may be saved by disrupting the current services. In this regard, dashboard 365 may visually illustrate a range of predicted performance enhancements that may be achieved by disrupting the current services.

One difference between the low prediction and the high prediction may be the aggressiveness by which the embodiments attempt to achieve the performance enhancements. For instance, to achieve the high prediction values, the embodiments may solicit responses from a larger number of candidate suppliers to supply the resource (to be discussed in more detail later) while the embodiments may solicit responses from a smaller number of candidate suppliers to achieve the low prediction.

Another difference with regard to how the low and high predictions are accomplished may be related to a timing element. For example, if a restricted time duration is mandated, then there is a potential that the performance enhancement process may be cut short, thereby leading to lower performance enhancements (i.e. the low prediction). On the other hand, if there is a prolonged time duration (or no duration), then the embodiments are able to be more selective in choosing suppliers and resources and may, therefore, be able to command better terms, thereby leading to the high prediction. Accordingly, various conditions may impact the differences between the low and high predictions.

In addition to the dashboard 365, any number or type of report may also be generated and provided to the client for review. Whereas the dashboard 365 provides a high-level overview of the potential performance enhancements broken down per category, a more detailed report may be generated detailing the predicted performance enhancements at a more granular level (e.g., for each category or perhaps even for specific resources). The dashboard 365 and/or the report may be provided to a client for review to determine which categories, resources, and/or predictions to pursue in the next stage of the transactional flow. In some cases, this report may be a so-called "dynamic report," which will be discussed in more detail later. Accordingly, based on client selection of a particular category, resource, or perhaps even prediction, the client selection operates to trigger the commencement of the next stage in the transactional flow.

Figure 3C:
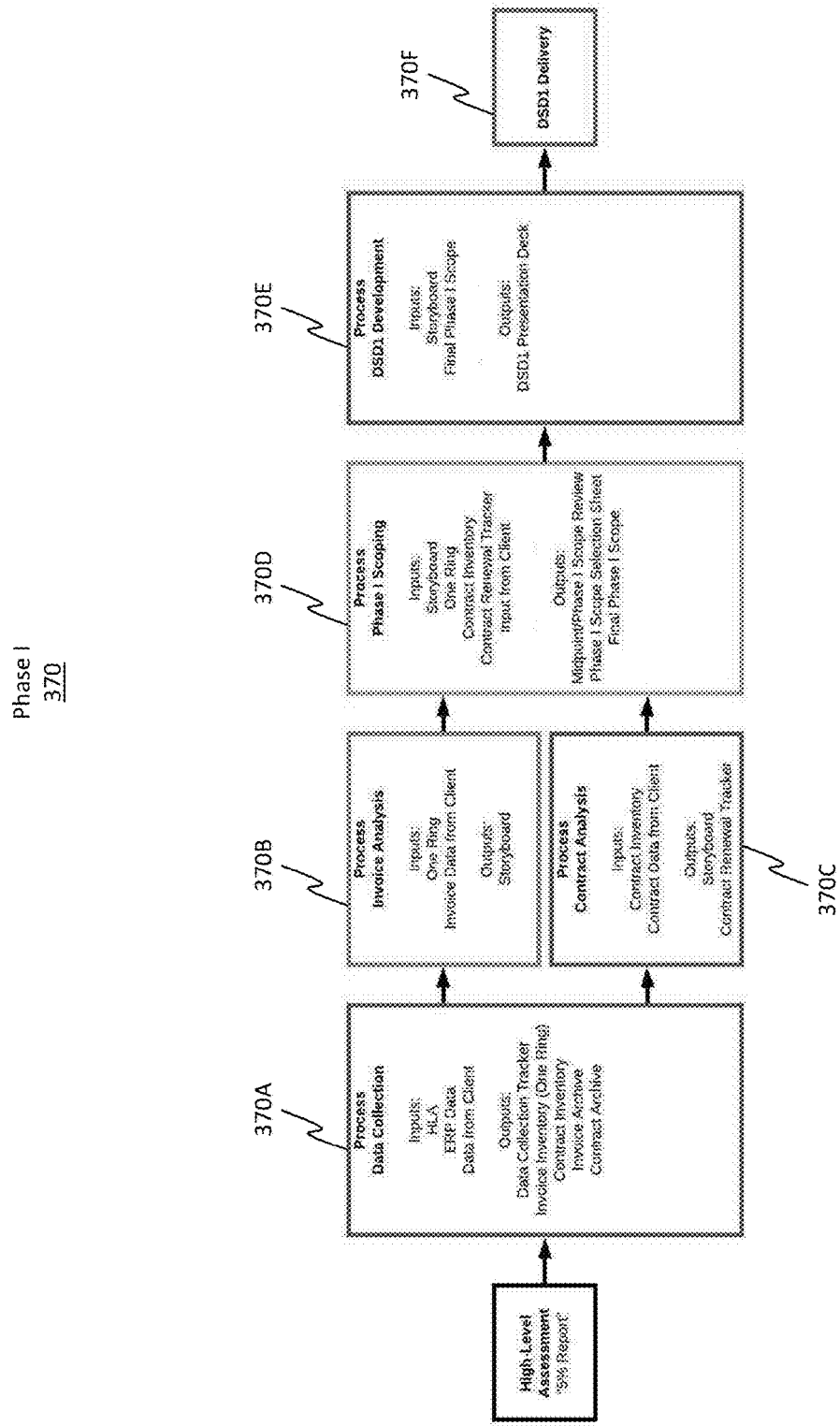
FIGS. 3C, 3D, 3E, and 3F illustrate a few additional flow diagrams detailing some example implementations of the phase I stage.

FIGS. 3C, 3D, 3E, and 3F illustrate a few additional flowcharts of how the phase I stage may be implemented. Specifically, FIG. 3C shows phase I 370, which is representative of the phase I stages discussed thus far. FIG. 3C further shows how, after a HLA is received, a number of operations may be performed, as shown by operations 370A, 370B, 370C, 370D, 370E, and 370F. These operations were described in detail in the earlier flowchart, but this illustration is provided as additional information to help supplement the earlier information.

Figure 3D:
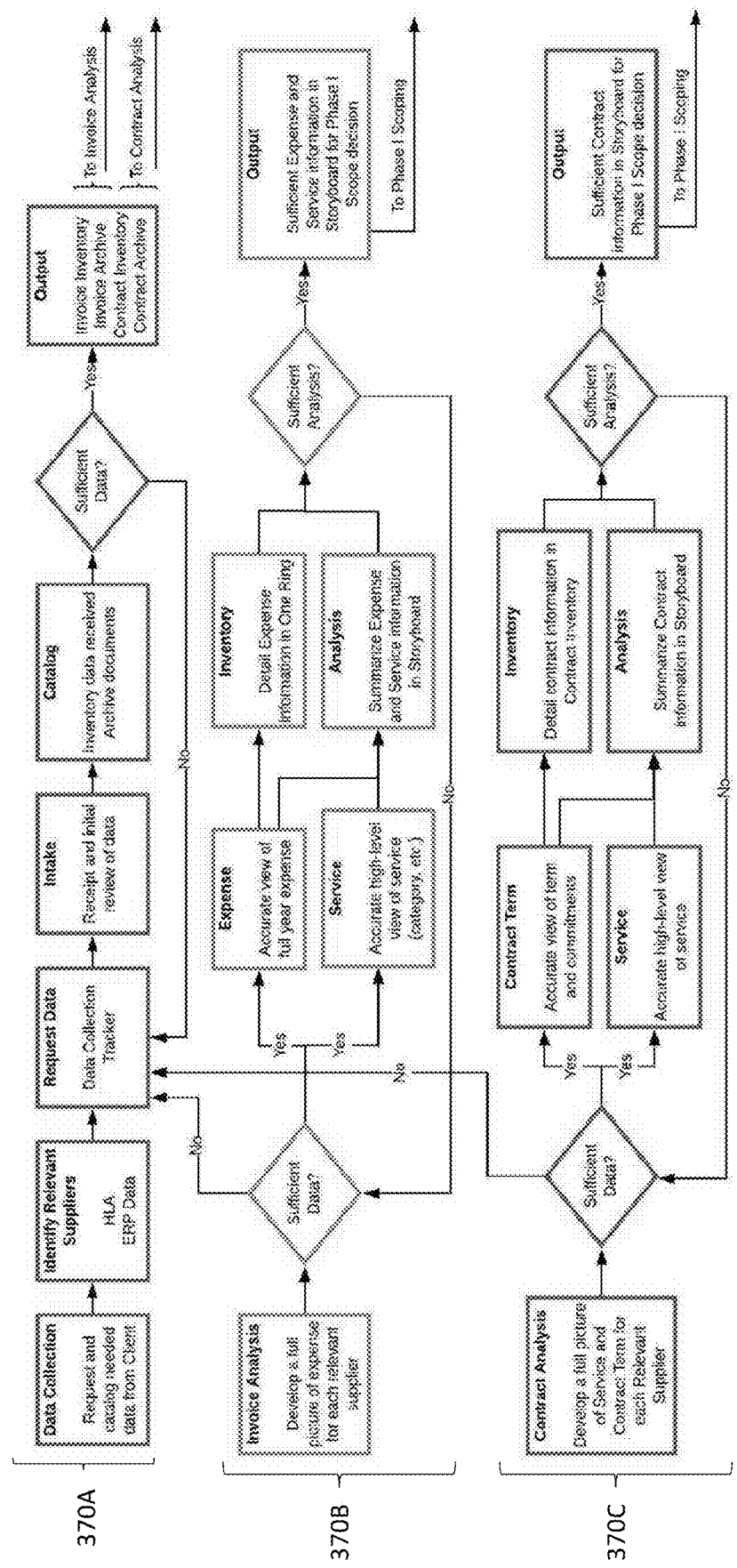
Figure 3E:
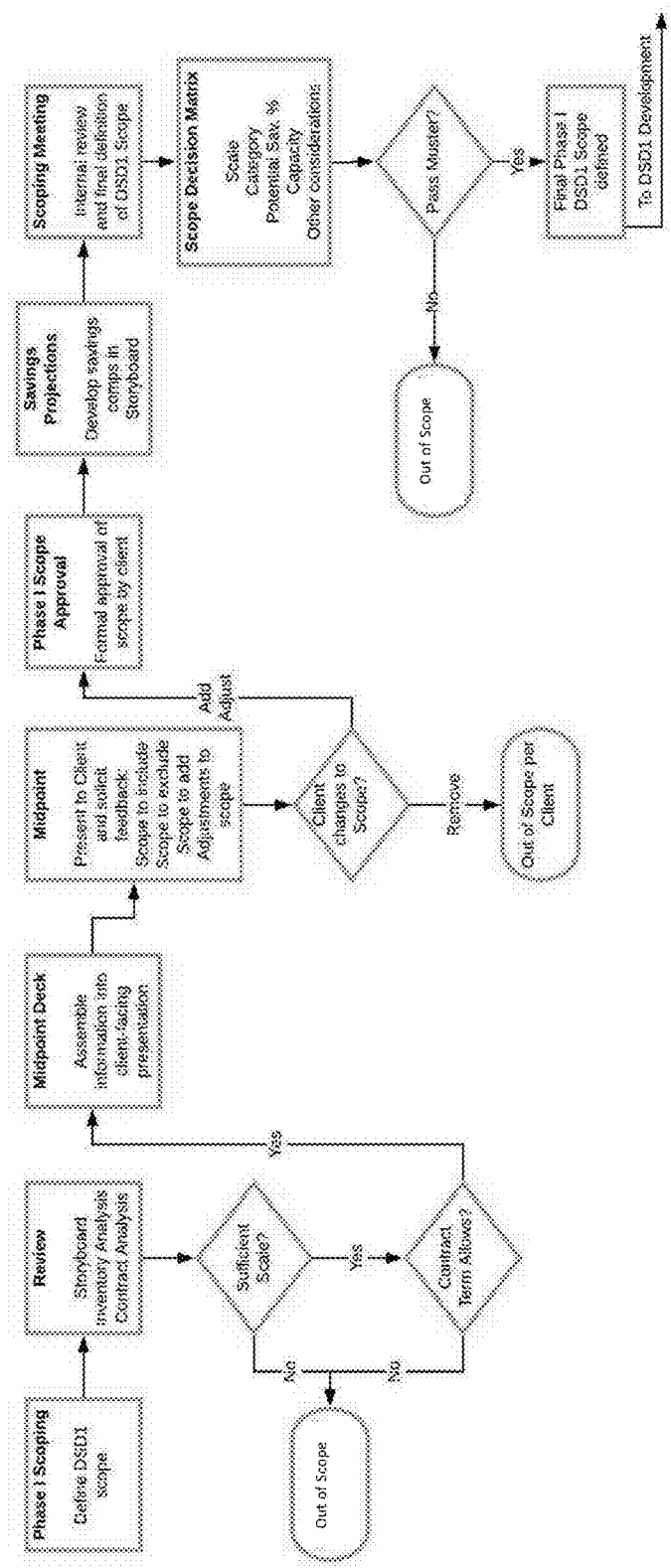
Figure 3F:
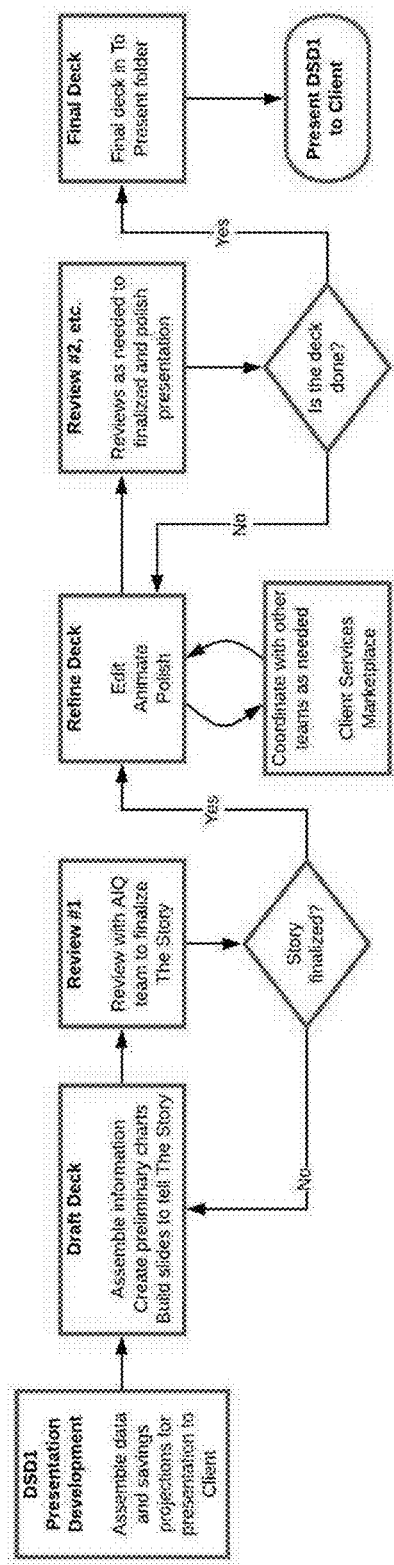

FIG. 3D shows further details regarding operations 370A, 370B, and 370C. Again, the flowchart is self-explanatory. FIG. 3E provides further details regarding operation 370D, and FIG. 3F shows further details regarding operation 370E. Accordingly, the aggregation of these different operations constitutes the phase I stage.

Phase II—Resource Selection, Feedback Loop, and Dynamic Learning

Figure 4A:
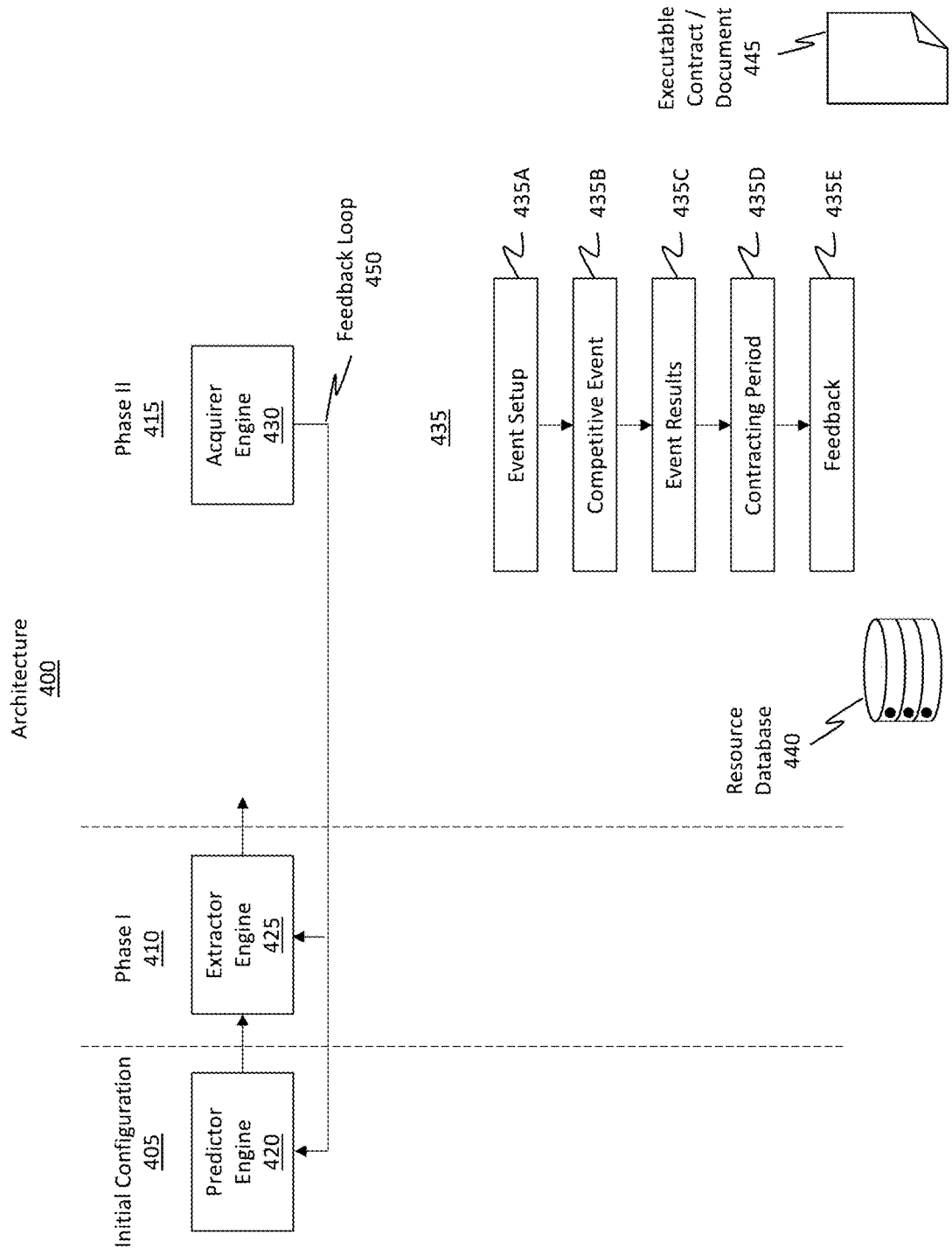
FIG. 4A illustrates details regarding some of the operations that may be performed during a phase II stage of the transactional flow.

FIG. 4A shows an example architecture 400, which is representative of the architectures discussed thus far. For instance, FIG. 4A shows three separate stages, including the initial configuration 405, phase I 410, phase II 415, the predictor engine 420, the extractor engine 425, and the acquirer engine 430. Each of these phases and engines is representative of the phases and engines discussed previously. Additionally, FIG. 4A is primarily focused on operations performed during phase II 415.

Phase II 415 commences subsequent to completion of phase I 410 and is triggered in response to client input selecting specific categories, resources, or even predictions. During phase II 415, the embodiments perform processes to select either a new resource to substitute for an existing resource, obtain a new supplier of a resource, or modify terms with an existing supplier of a resource to obtain performance enhancements.

Attention will now be directed on a specific resource selection technique, namely selecting a new supplier of a resource to substitute or replace an existing supplier. This selection process is facilitated through the use of a reverse auction, which attempts to obtain a lower price for a good or service as opposed to obtaining a higher price.

Based on the number of categories, resources, or predictions that were selected, the embodiments generate any number of workflows to command operations associated with each respective selection. FIG. 4A illustrates a flowchart of an example method 435 that may be performed by the acquirer engine 430 to facilitate the selection process.

Initially, method 435 includes an act (act 435A) of performing an event setup in which the reverse auction is organized. To organize the reverse auction, the embodiments perform a number of preparatory steps. These steps are outlined in FIG. 4B.

Figure 4B:
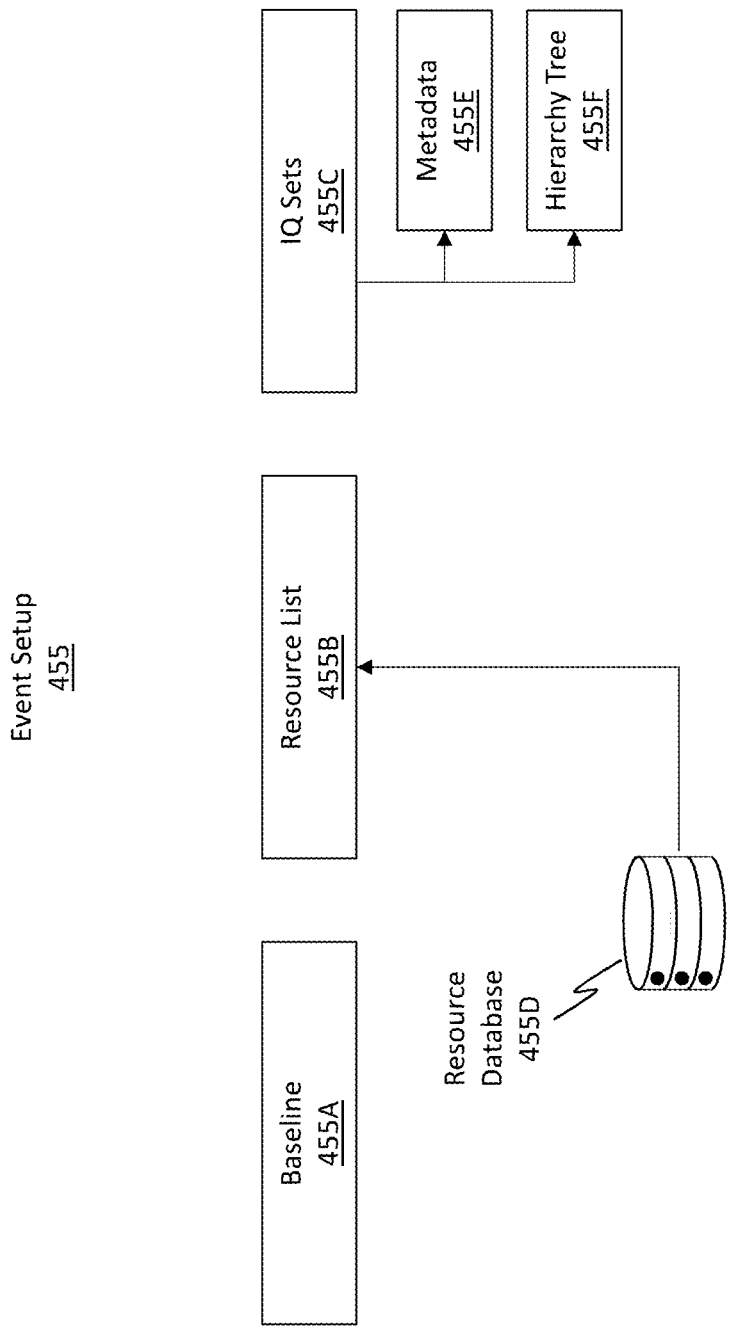
FIG. 4B illustrates some aspects related to setting up an event to select a resource.

For instance, FIG. 4B illustrates an event setup 455, which is representative of the event setup mentioned in method act 435A of FIG. 4A. Here, the embodiments gather or compile a baseline 455A, which is representative of the baseline 355 mentioned in FIG. 3A, a resource list 455B, and IQ sets 455C.

As described earlier, the baseline 455A is highly beneficial because it is what is relied on to determine what actual cost savings will be realized based on the results of the reverse auction. The resource list 455B may be generated from the supplier and resource information included in the resource database 455D, which is representative of the resource databases discussed thus far. For instance, it is highly beneficial to organize an auction in which a large number (or a threshold number) of suppliers are present to compete against one another. The larger the number of suppliers, the more competition will occur, thereby driving the price down and increasing performance enhancement (which is beneficial to the client). By having as robust, thorough, complete, and large resource database 455D as possible (e.g., via periodic updates to the database), the embodiments are able to maintain a large corpus of supplier data from which to select potential auction candidates.

The resource list 455B is compiled from the resource database 455D and is based on suppliers who have been identified as being able to potentially provide the desired resource, which is defined by the IQ sets 455C. That is, the IQ sets 455C are provided to drive suppliers into understanding the exact terms and conditions that are required to be satisfied in order to provide the requested resource. By comparing the IQ sets 455C against the credentials and capabilities of the suppliers in the resource database 455D, the embodiments are able to select any number of potential suppliers for inclusion into the resource list 455B. To be admitted onto the list, the suppliers may be required to have some indication of a corresponding skill set or past performance associated with the currently requested resource, where such information may be tracked in the resource database 455D. Additionally, or alternatively, a query may be provided to suppliers not currently listed as having skills related to the IQ sets to determine whether those suppliers may nevertheless still be interested in engaging with the reverse auction process. As such, the embodiments are not limited on selecting only confirmed suppliers, but rather the embodiments may attempt to solicit suppliers listed as having other skills. If those suppliers do in fact have the requisite skills, then the resource database 455D can be updated so future iterations are benefitted from the new supplier knowledge (e.g., those suppliers can be automatically included in other reverse auctions).

It will be appreciated how the IQ sets 455C may be associated with corresponding metadata 455E and a hierarchy tree 455F. The metadata 455E may describe additional features or preferences associated with a particular requirement outlined in the IQ sets 455C, where those features may not be required but instead may be preferred features. By way of example and without limitation, the metadata 455E may outline timing preferences, computing platform preferences, delivery preferences, development milestone preferences, and so forth. The features and/or preferences of the IQ sets 455C may be organized in the form of a hierarchy tree 455F comprising nodes and linkages between the nodes. Any type of tree data structure may be used to organize and structure the features outlined in the IQ sets 455C. Notably, the IQ sets 455C are published to each supplier listed in the resource list 455B whereas the baseline 455A and the resource list 455B are kept confidential as between the different suppliers. To clarify, the potential suppliers will not be made aware regarding the baseline 455A (i.e. the costs and expected or predicted savings), and they will not be made aware of which other suppliers are included in the resource list 455B (i.e. the identities of the suppliers will be anonymous as between one another).

Returning to FIG. 4A, once the event setup is complete, invitations are distributed to the candidate suppliers to invite them to the event, where the invitation lists the IQ sets so as to inform the suppliers what the requirements are. In some cases, the IQ sets also list an initial starting bid price that bidding will begin at. If the suppliers accept the invitation, then they will be admitted into the reverse auction and be eligible to submit bids in an effort to disrupt the current resource and replace the resource with their own resource.

Method 435 then includes an act (act 435B) in which the competitive event is hosted. One will appreciate how the number of competitive events may be based on the number of workflows that were generated, where this number is dependent at least on the number of categories, resources, and/or predictions that were selected by the client to pursue in an attempt to achieve performance enhancements.

Figure 4C:
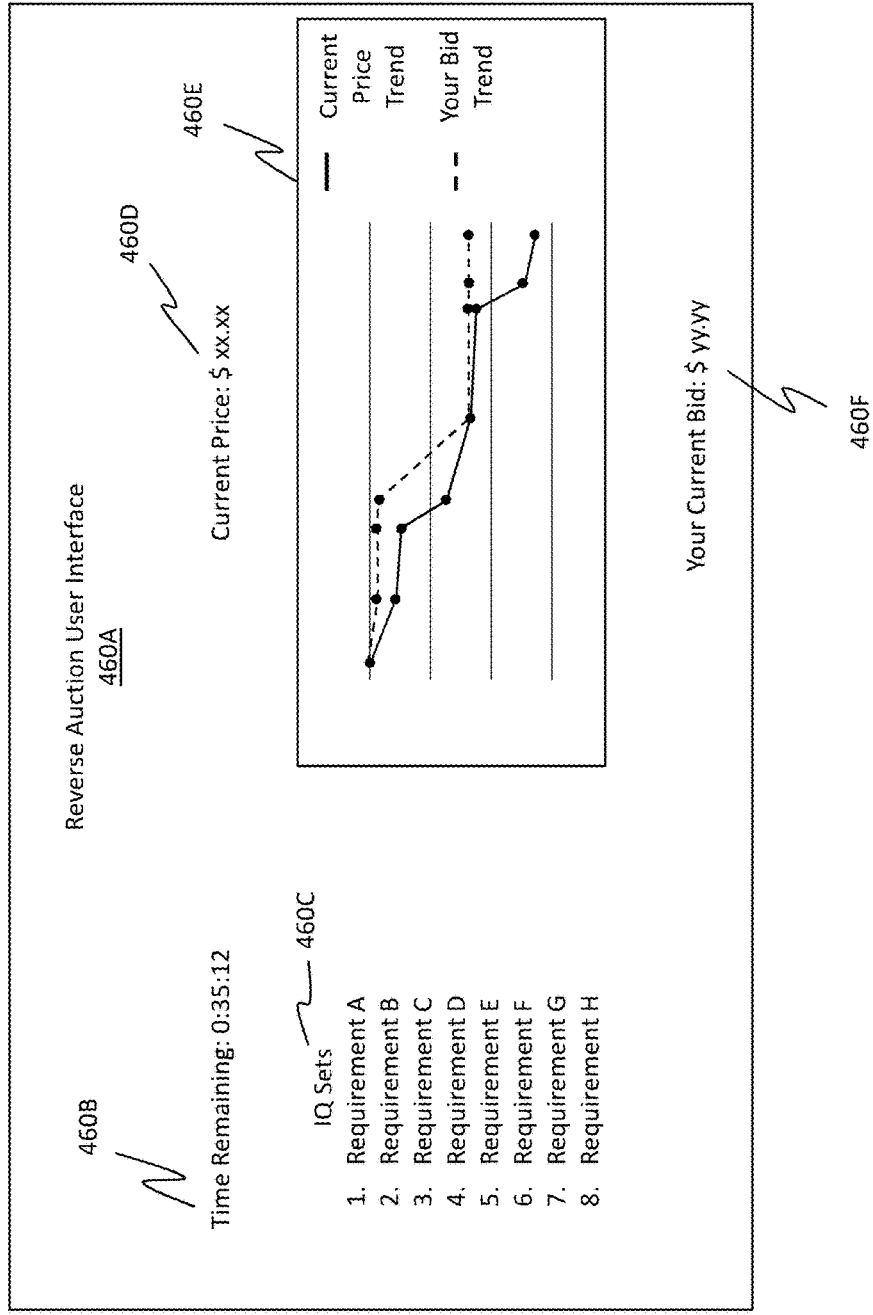
FIG. 4C illustrates an example user interface related to a reverse auction.

FIG. 4C illustrates an example of a reverse auction 460, which is representative of the competitive event mentioned in act 435B of FIG. 4A. Notably, FIG. 4C shows an example of a reverse auction user interface 460A, which includes user interface elements specifically structured in an effort to improve how reverse auctions are executed and to provide information to a user.

In the scenario shown in FIG. 4C, which scenario is provided for example purposes only and should not be construed as limiting, the reverse auction user interface 460A includes a time remaining element 460B indicating how much time is remaining in the reverse auction, a listing of the IQ sets 460C, a current price 460D, a graphical representation 460E of the change in price over the auction time period, and a supplier's current bid 460F. By beneficially outlining the reverse auction user interface 460A in this manner, a supplier will be able to readily discern his/her position or current bid 460F relative to the current price 460D.

In some cases, the reverse auction user interface 460A additionally provides an explicit ranking of a supplier as compared to other suppliers, where the ranking indicates the supplier's relative position with regard to winning the auction. For instance, the supplier having a ranking of #1 will be supplier who has underbid all the other suppliers. The supplier having a ranking of #2 will be the supplier who has underbid all the other suppliers except for the #1 supplier.

Whereas traditional procurement services may be in contact with 1, 2, 3, or perhaps even 4 different suppliers, the disclosed embodiments are capable of linking the client with dozens or even hundreds of potential suppliers. By linking the client with a larger number of candidate suppliers, the client will be highly benefitted because he/she will likely be able to capitalize on substantially larger performance enhancements as compared to a scenario where only 1-4 suppliers are known by the client. Accordingly, the disclosed embodiments bring about substantial benefits by effectively casting a larger "net" (e.g., a worldwide network) to connect potential suppliers with the client.

As described earlier, the number of workflows or reverse auctions may be dependent on the number of categories, resources, or predictions selected by the client. In some cases, a workflow may be dependent on the results of a previous workflow (e.g., a dovetail chain of workflows) while in other instances multiple workflows may run in parallel or asynchronously relative to one another. For clarity, as used herein, a "workflow" generally refers to a specific instance of a reverse auction. Accordingly, multiple resources and/or categories may be selected to enter phase II, and corresponding reverse auctions may be initiated for each one of the selected resources and/or categories.

Figure 4D:
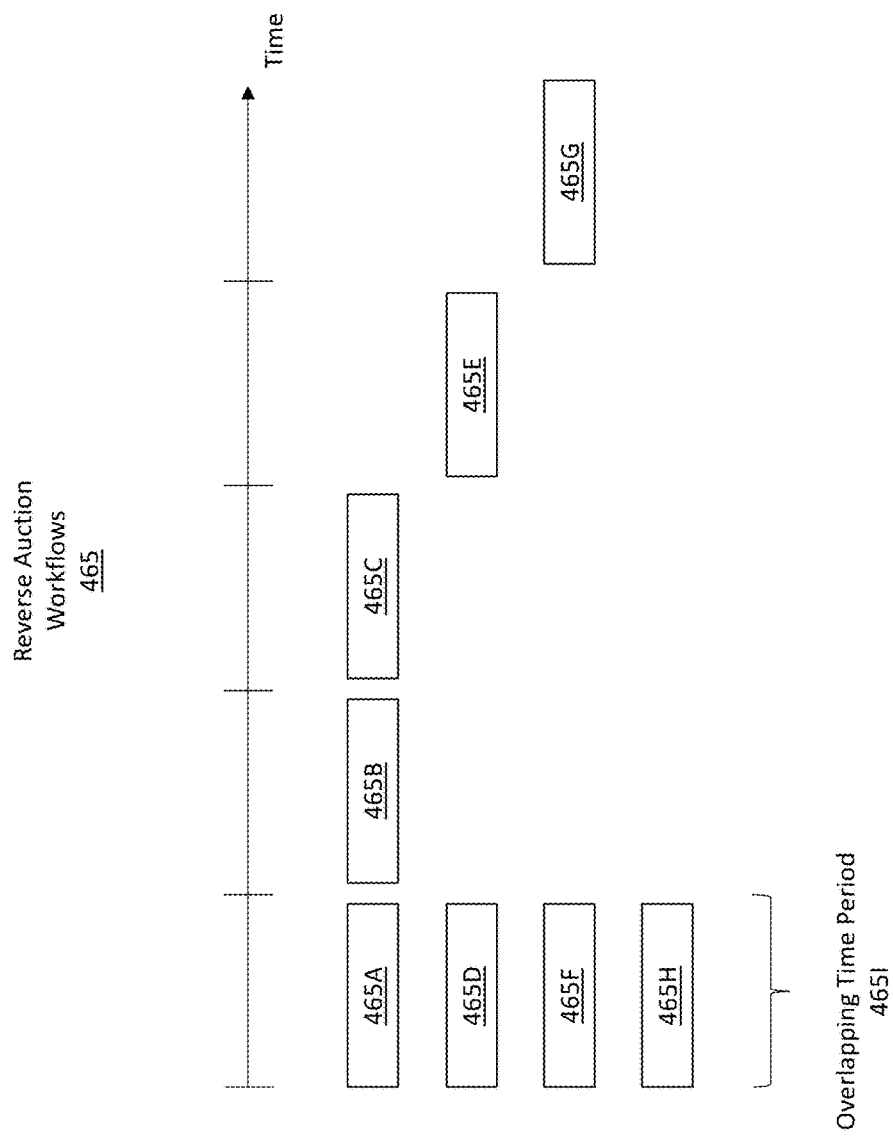
FIG. 4D illustrates how multiple different reverse auctions or "workflows" may execute in parallel with one another or in series with one another.

FIG. 4D illustrates various different reverse auction workflows 465 that are executing across a timeline. In particular, FIG. 4D shows workflows 465A, 465B, 465C, 465D, 465E, 465F, 465G, and 465H, each of which is representative of a different instance of a reverse auction that is executing in an attempt to achieve improved performance enhancements for a particular category or resource.

In this scenario, workflow 465B is dependent on a result generated by workflow 465A, and workflow 465C is dependent on a result generated by workflow 465B (such that workflow 465C executes subsequent to workflow 465B). Workflow 465E is dependent on a result of both workflow 465D and workflow 465C. Similarly, workflow 465G is dependent on a result of both workflow 465F and workflow 465E. Workflows 465A, 465D, 465F, and 465H are shown as all executing during a same overlapping time period 4651. In some cases, those workflows begin and end at the same time while in other cases only a portion of their execution times overlap. Accordingly, any number of workflows may execute in a synchronous or asynchronous manner. As an analogy, the reverse auction workflows 465 may be likened to a multi-threaded computer capable of executing multiple threads contemporaneously with one another to perform parallel processing.

Returning to FIG. 4A, method 435 then includes an act (act 435C) of compiling event results. In some cases, act 435C may be performed immediately after completion of a workflow while in other cases act 435C may be performed periodically in an effort to batch the results from multiple workflows together. In any event, the results from the reverse auction workflows include a notification regarding a selected number of ranked suppliers, such as, perhaps, the top three ranked suppliers. The embodiments beneficially include multiple suppliers in the notification in an effort to safeguard against situations in which one or two suppliers subsequently backout of the process. Because no contract has been executed, the suppliers via the reverse auction are submitting an indication of a willingness to engage with the client.

Then, method 435 includes an act (act 435D) in which a period of time is provided to generate or modify a contract, such as executable contract/document 445. In some instances, a new contract/document is automatically generated by the acquirer engine 430 listing the terms and conditions previously outlined in the IQ sets as well as any other terms and conditions routinely included in a contract/document (and also the final price of the reverse auction). In other instances, an existing contract/document is modified in order to change or update existing terms and conditions to reflect the new terms and conditions listed by the IQ sets and the final price of the reverse auction. Additionally, this contract/document is generated or modified based on the selected resource, category, or prediction used as the basis for the corresponding reverse auction.

In some embodiments, the resource database 440, which is representative of the resource databases discussed thus far, is also updated to reflect information related to the reverse auction. For instance, the updates may include which suppliers participated in the reverse auction, what the bidding prices were, what the final price was, how long the auction lasted, as well as reputation data associated with the suppliers (e.g., did the supplier later back out of the auction or back out of their final price quote).

Method 435 then includes an act (act 435E) of providing feedback to each stage in the transactional flow, which comprises the initial configuration 405, phase I 410, and phase II 415. By way of example, the acquirer engine 430, which may be the entity executing method 435, is shown as being involved in a feedback loop 450 in which the extractor engine 425 and the predictor engine 420 are receiving feedback from the acquirer engine 430. Because these different engines may be implemented using machine learning or automata learning, the engines are able to receive the feedback and modify their respective operations. For instance, if a particular reverse auction generated bids lower or higher than previously anticipated or estimated, then the predictor engine 420 may adjust its predictions to reflect a potential increase or decrease in predicted performance enhancements. In this regard, the results generated by the acquirer engine 430 may be used to drive future operations of both the predictor engine 420 and the extractor engine 425.

Figure 4E:
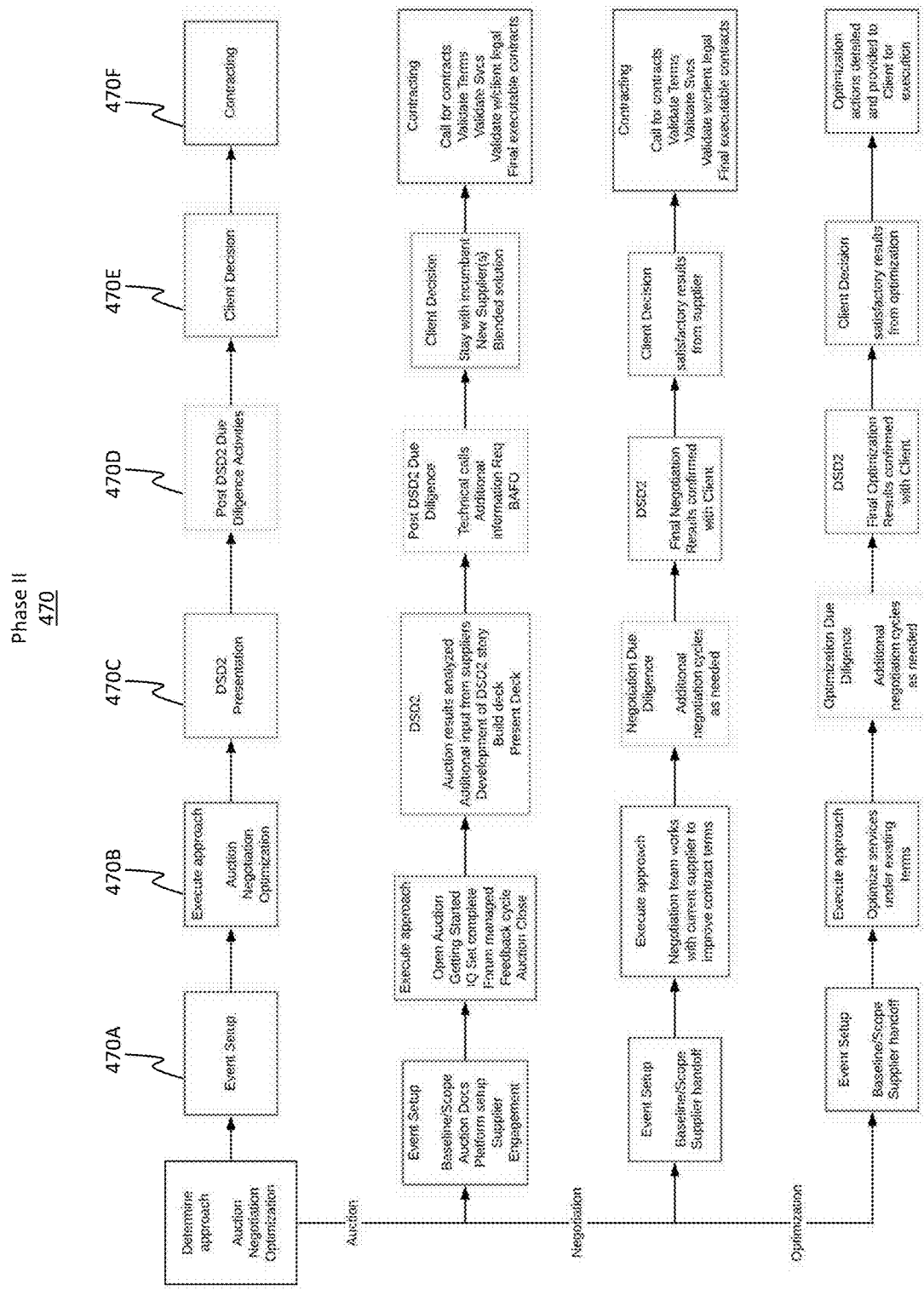
FIGS. 4E, 4F, 4G, 4H, 4I, and 4J illustrate a few additional flow diagrams detailing some example implementations of the phase II stage.

FIGS. 4E, 4F, 4G, 4H, 4I, and 4J provide some additional, self-illustrating or self-explanatory visualizations regarding the operations that may occur during the phase II stage. For instance, FIG. 4E shows phase II 470, which is representative of the phase II stages discussed thus far. Phase II 470 includes different operation, including operations 470A, 470B, 470C, 470D, 470E, and 470F. Of course, multiple instances of each one of these operations may be performed in parallel with one another, as shown in FIG. 4E.

Figure 4F:
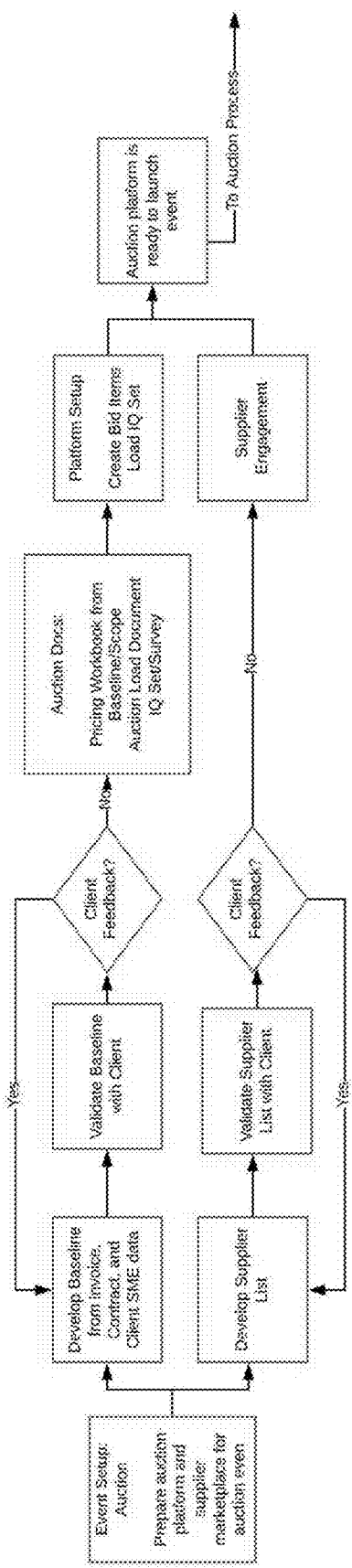
Figure 4G:
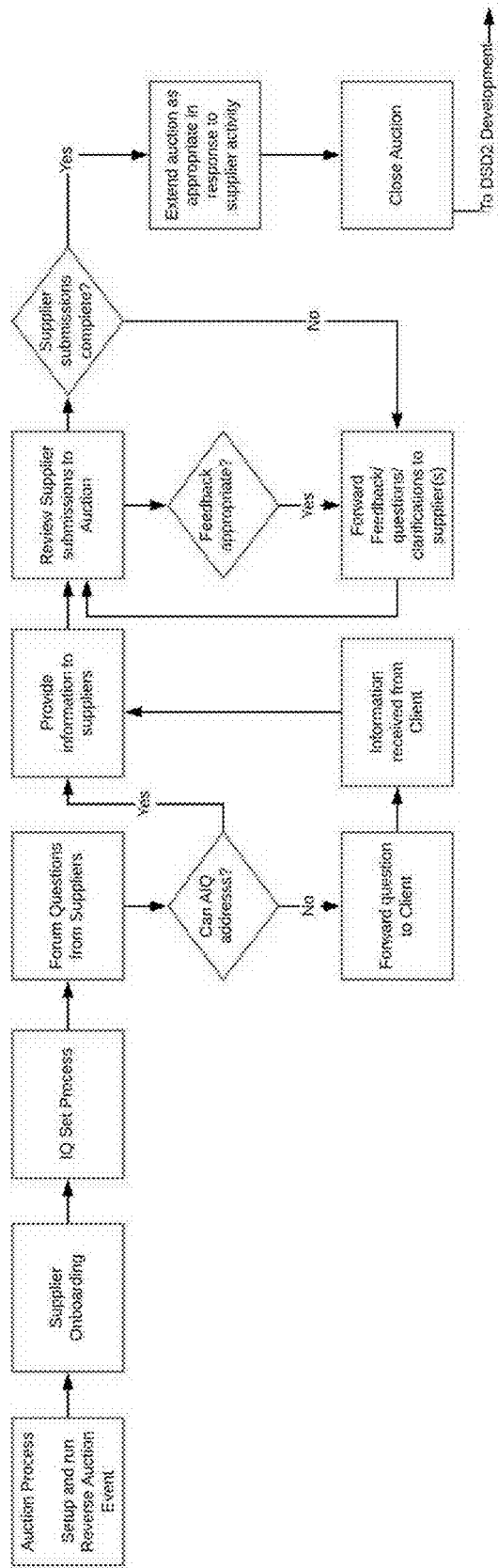
Figure 4H:
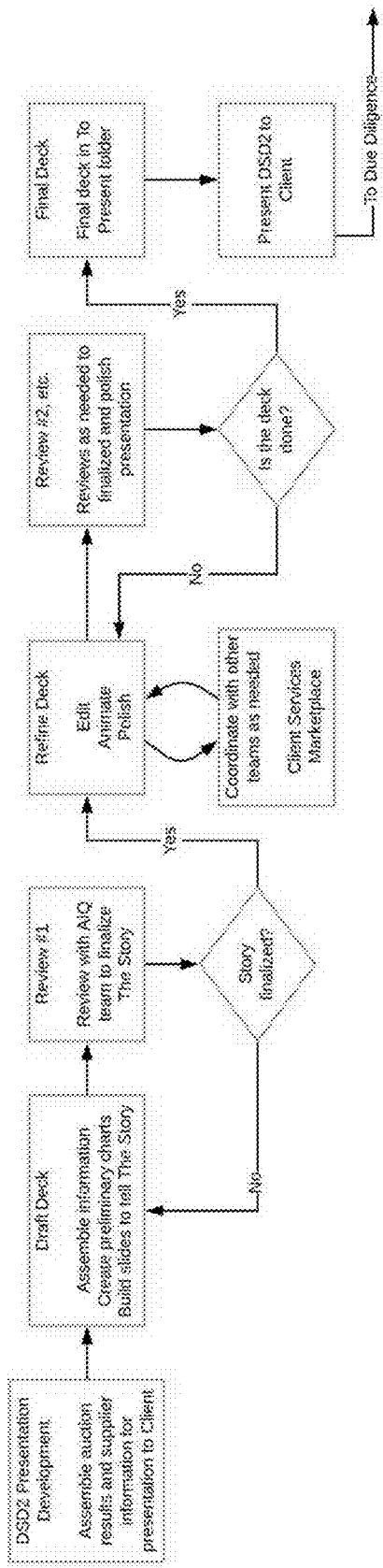
Figure 4I:
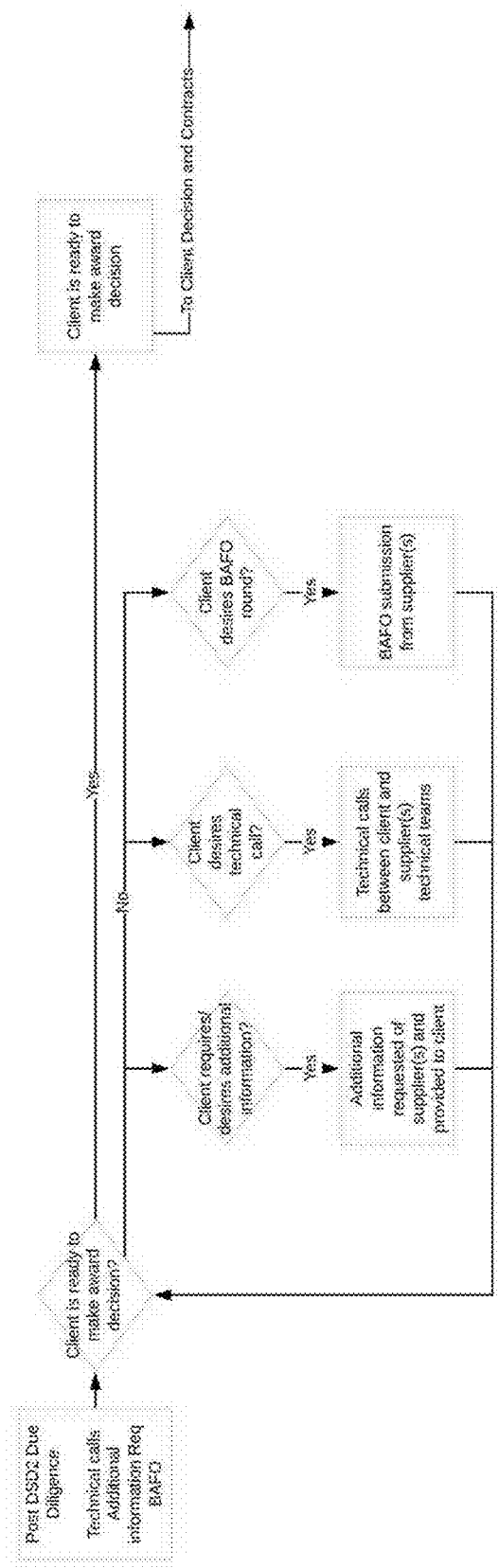
Figure 4J:
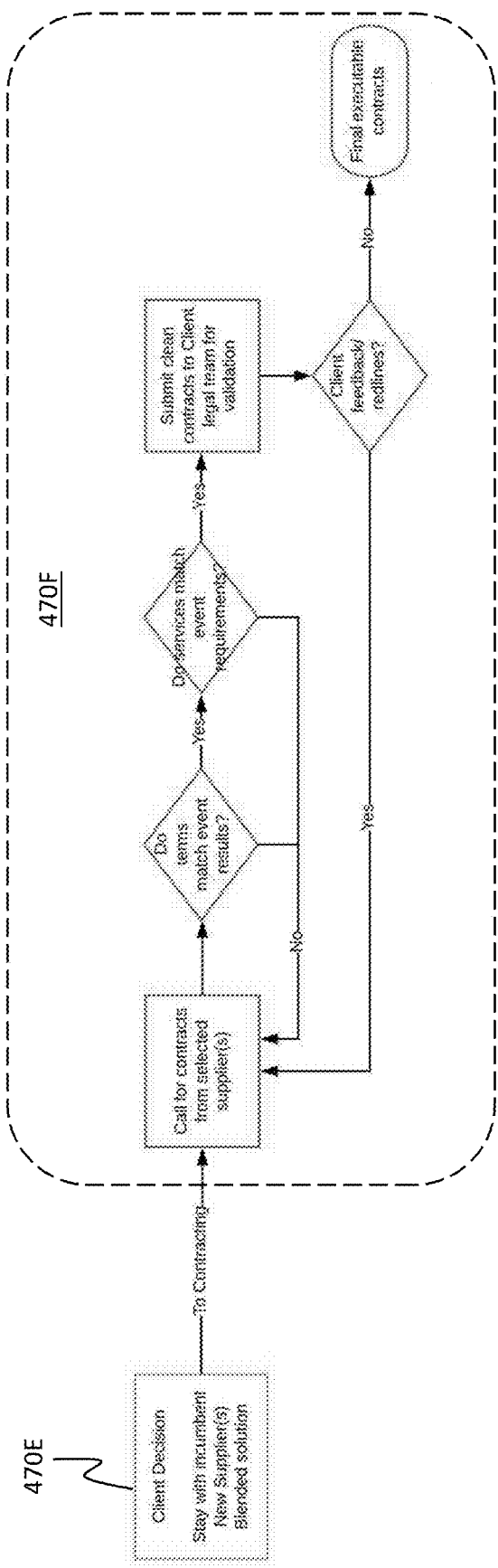

FIG. 4F provides some additional information regarding the operation 470A, and FIG. 4G provides some additional information regarding the operation 470B. FIG. 4H illustrates example implementations of operation 470C, and FIG. 4I illustrates example implementations of operation 470D. Finally, FIG. 4J shows both operations 470E and 470F. The summation or compilation of these different operations constitutes the phase II stage. Furthermore, these example flowcharts are provided to augment or supplement the detailed description of phase II that was provided earlier.

Example Methods for Iteratively Modifying how Resources are Selected Based on Feedback The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5A:
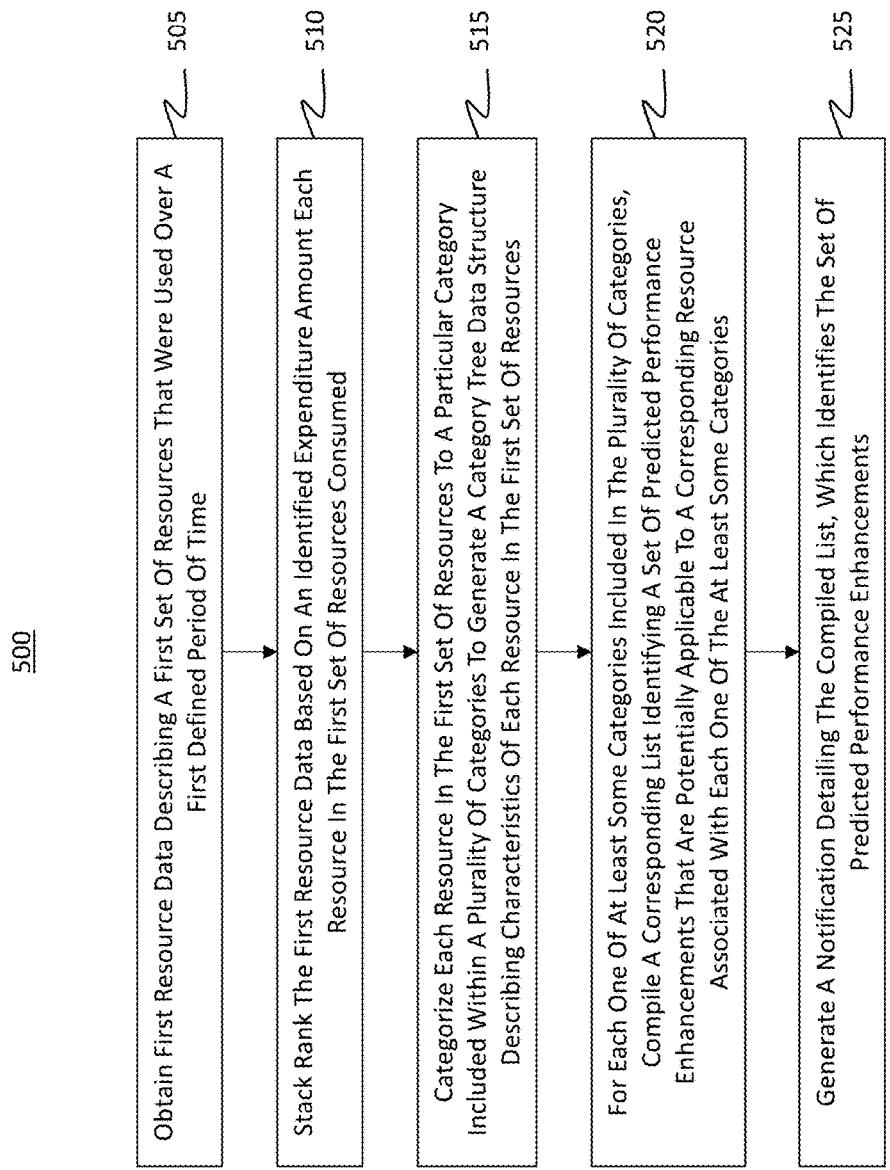
FIGS. 5A, 5B, and 5C illustrate flowcharts of an example method for iteratively modifying how a resource is selected based on learned feedback.
Figure 5B:
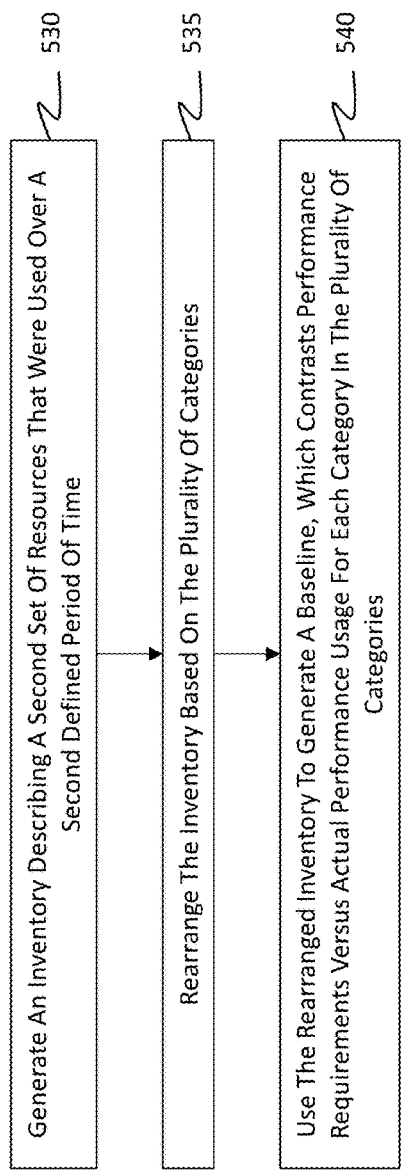
Figure 5C:
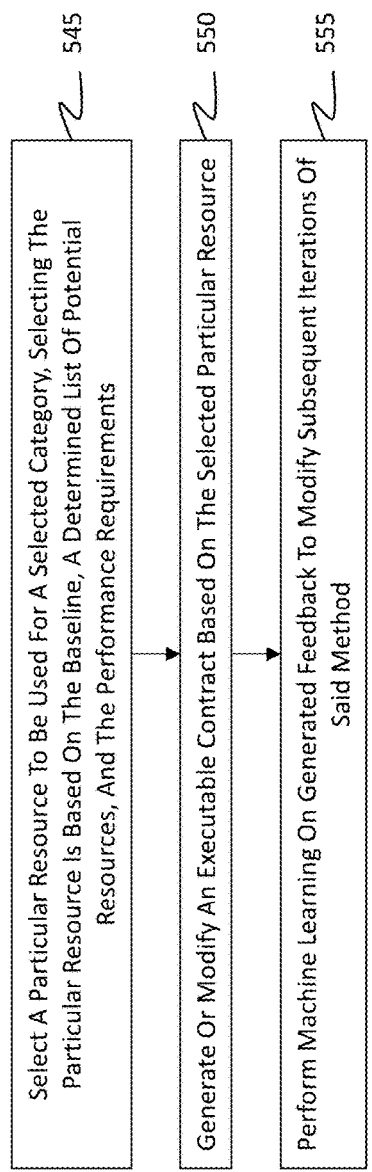

Attention will now be directed to FIGS. 5A, 5B, and 5C, which illustrate flowcharts of an example method 500 for iteratively modifying how a resource is selected based on feedback acquired during one or more previous iterations in which a previous resource was selected. The method acts in FIG. 5A correspond to the initial configuration stage discussed herein and may be performed by the predictor engine. Likewise, the method acts of FIG. 5B correspond to phase I and may be performed by the extractor engine, and the method acts of FIG. 5C correspond to phase II and may be performed by the acquirer engine.

Turning first to FIG. 5A, method 500 is shown as including an act (act 505) of obtaining first resource data describing a first set of resources that were used over a first defined period of time. This process corresponds to the acquiring data process described in connection with FIG. 2A.

Then, method 500 includes an act (act 510) of stack ranking the first resource data based on an identified expenditure amount each resource in the first set of resources consumed. For instance, resources that consumed relatively higher expenditure amounts (e.g., costs) are ranked relatively higher than resources that consumed relatively lower expenditure amounts. Expenditure amounts may be based on a combination of factors, including monetary costs, man hours, and even computing resources (e.g., processor cycles, memory usage, and so on).

In act 515, the predictor engine then categorizes each resource in the first set of resources to a particular category included within a plurality of categories. Examples of categories were provided earlier. This process generates a category tree data structure describing characteristics of each resource in the first set of resources, such as the category tree discussed in connection with FIG. 2C.

For each one of at least some of the categories, there is an act (act 520) of compiling a corresponding list identifying a set of predicted performance enhancements. These performance enhancements are potentially applicable (i.e. they are estimates) to a corresponding resource or associated with each one of the categories or, alternatively, applicable to an entire category. To clarify, for at least some of the categories, the embodiments operate to generate a prediction detailing a potential cost savings that may be realized by disrupting the current service. This disruption may occur by replacing the current supplier with a new supplier, by using a new replacement resource in place of the current resource, or even by negotiating new terms and conditions with the existing supplier.

A notification is then generated (act 525). This notification details the compiled list, which identifies the set of predicted performance enhancements. Additionally, the notification is provided to the client for review and potential approval. The notification may be transmitted using email, SMS, voice message, or any other technique for relaying information. Depending on a response from the client, the next stage in the transactional flow may or may not be triggered. That is, if the client submits user input indicating the next stage should be implemented, then the next stage will be triggered; otherwise, the next stage will not be triggered.

FIG. 5B continues with the method 500, but now the method 500 has entered phase I, which is executed or implemented by the extractor engine. That is, the extractor engine is configured to perform the method acts listed in FIG. 5B based on a determination that the set of predicted performance enhancements satisfy a predetermined performance enhancement threshold. For instance, the client may have determined that the projected or predicted performance enhancements/cost savings satisfy a particular dollar savings amount (e.g., perhaps $1,000, $2,000, $5,000, $10,000, $50,000, $100,000, or any other amount) or a particular percentage savings amount (e.g., 0.5%, 1.0%, 2.0%, 5.0%, 10.0%, 20.0%, 50.0%, or any other percentage).

Method 500 includes an act (act 530) of generating an inventory (e.g., the inventory discussed in connection with FIG. 3A) describing a second set of resources that were used over a second defined period of time (e.g., time period 335). Here, the second set of resources are relatively more comprehensive than the resources that were collected during the initial configuration, as described earlier.

The inventory is then rearranged (act 535) based on the categories. For instance, categories that consumed a largest dollar amount may be listed at the top of the inventory while categories that consumed relatively less are listed at lower positions. In some cases, the information included in the inventory is visually displayed in the form of graphs, charts, or any other type of plot. In some cases, the inventory includes a pie chart detailing relative consumption percentages for each category as compared to the other categories included in the pie chart.

The rearranged inventory is then used (act 540) to generate a baseline. This baseline beneficially contrasts performance requirements versus actual performance usage for each of the categories. Additionally, the baseline may provide an updated or further refined prediction regard potential savings or performance enhancements. The baseline may then be provided to a client for review and selection of a particular category or resource on which to focus in an attempt to achieve performance enhancements.

Turning now to FIG. 5C, method 500 is shown as including additional method acts, which are representative of phase II operations and which may be executed by an acquirer engine. Furthermore, the acquirer engine is configured to perform these method acts based on a selection of a particular one or more of the categories, or perhaps even one or more resources within a category.

Method 500 includes an act (act 545) of selecting a particular resource to be used for the particular selected category. This selection process is based on (1) the baseline, (2) a determined list of potential resources, and (3) the performance requirements (e.g., the IQ sets). In some cases, the selection process is based on a reverse auction in which multiple potential suppliers are provided the opportunity to compete against one another to win the reverse auction. In some cases, the selection process is based on an optimization process in which optimizations are identified to increase the efficiency of the existing resource (e.g., shifting priorities from one assignment to another assignment to enable the other assignment to be completed more quickly due to the increased amount of resources being used). In some cases, the selection process is based on renewed negotiations between the client and the supplier of the resource in an effort to obtain lower costs or increased quality for the client.

Based on the selection of the resource, method 500 then includes an act (act 550) of generating or modifying an executable contract/document. This contract/document is generated or modified in order to reflect the current resource that was selected during the previous selection process. Any amount or number of line items in the contract/document may be modified based on the selection process. For instance, information pertaining to the supplier of the resource may be included in the contract/document as well as the IQ set (i.e. the performance requirements). Additional information, such as timing requirements or even preferences may also be included in the contract/document.

In accordance with the disclosed principles, the embodiments also perform (act 555) progressive machine learning by causing the predictor engine and the extractor engine to receive feedback from the acquirer engine and to perform machine learning on the received feedback. By receiving this feedback, those engines are able to modify their subsequent operations in an effort to fine tune or improve their respective performances and decision-making operations. Additionally, the resource database may also be updated to include additional information stemming or resulting from the performance of the selection process (e.g., perhaps which suppliers actively submitted bids in the reverse auction).

Figure 6:
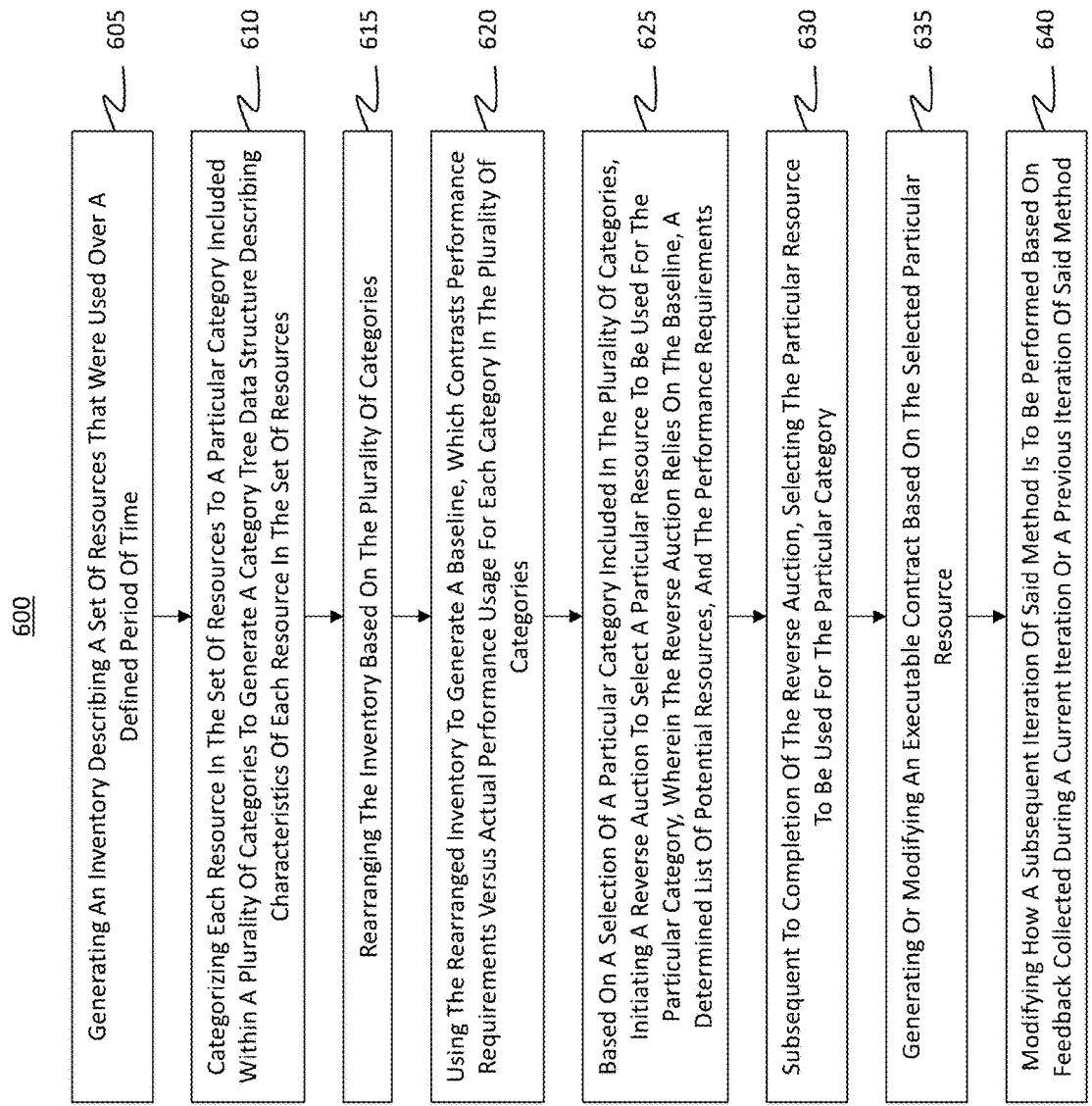
FIG. 6 illustrates another flowchart of an example method for specifically using a reverse auction to select a resource.

FIG. 6 illustrates another flowchart of an example method 600 that is related to the method 500 of FIGS. 5A, 5B, and 5C, but method 600 includes a few variances. As such, it is beneficial to present method 600 distinctly from method 500.

Initially, method 600 includes an act (act 605) of generating an inventory describing a set of resources that were used over a defined period of time. The inventory generation process may correspond to the processes that were described earlier in phase I. In some cases, the inventory may be automatically and periodically generated based on a subscription the client has, where the subscription triggers the automatic generation of the inventory. Additional details on subscriptions will be provided later.

Then, each resource in the set of resources is categorized (act 610) to a particular category. This categorization is performed to generate a category tree data structure describing characteristics of each resource in the set of resources. The category tree data structure is beneficial because it imposes structure to the resource data, which may not have been previously structured. The inventory is then rearranged (act 615) based on the categories. By "rearrange," it is generally meant that the data in the inventory is organized in a manner so that resources having common characteristics, such as a common category, are grouped together under the same parent node in the category tree data structure.

The rearranged inventory is then used (act 620) to generate a baseline. This baseline contrasts performance requirements versus actual performance usage for each of the categories. The baseline provides a ground truth regarding areas where efficiencies or performance enhancements may be achieved (e.g., by identifying discrepancies between actual usage and purchased usage or bandwidth).

Based on a selection of a particular one of the categories, method 600 includes an act (act 625) of specifically initiating a reverse auction to select a particular resource to be used for the particular category in place of an existing resource or perhaps as an entirely new resource. Whereas method 500 was generally focused on any number of potential selection or optimization techniques, method 600 is specifically focused on the use of a reverse auction to select a resource. Notably, this reverse auction relies on or is dependent on the baseline, a determined list of potential resources, and the performance requirements.

Subsequent to completion of the reverse auction, there is an act (act 630) of selecting the particular resource to be used for the particular category. An executable contract/document is then generated or modified (act 635) based on the selected particular resource. Additionally, a modification process is performed to modify (act 640) how a subsequent iteration of method 600 is to be performed based on feedback collected during a current iteration or a previous iteration of method 600.

By performing the disclosed operations, the embodiments are able to drive market trends as opposed to being merely reactive to market trends. Additionally, the embodiments are able to provide significant performance enhancements for clients by connecting clients to a larger number of potential suppliers of a resource or even by providing those clients with additional negotiation leverage.

Subscription Models

Figure 7:
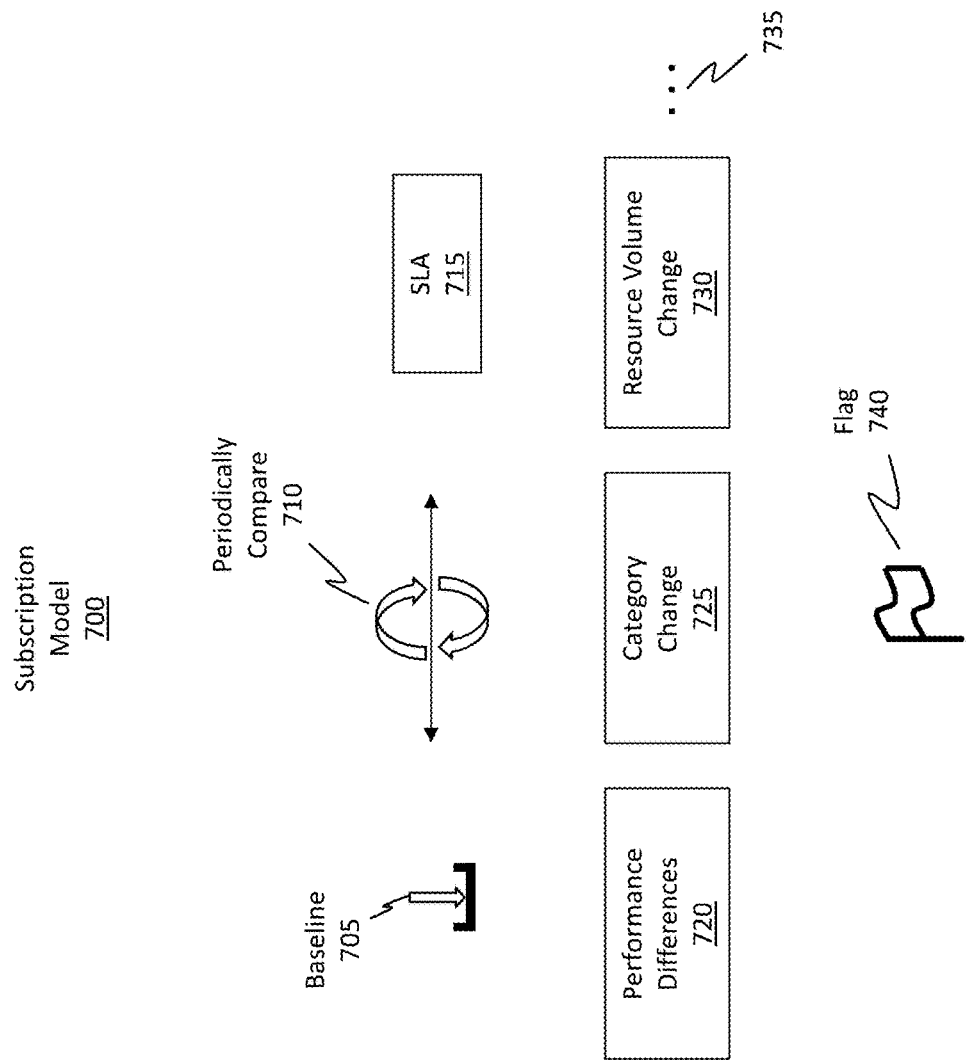
FIG. 7 illustrates an example of a subscription model that may be used to periodically alert clients regarding changes to aspects related to a resource.

Attention will now be directed to FIG. 7, which illustrates a type of subscription model 700 that may be employed by the disclosed embodiments to help facilitate dynamically selecting a resource and to help provide triggered notifications or reminders in response to certain identified conditions. The subscription model also helps facilitate efficiencies by enabling the embodiments to skip the initial configuration stage and potentially immediately entering phase I.

Subscription model 700 illustrates a scenario where a baseline 705, which is representative of the baselines discussed thus far and which may be computed, determined, or generated on a periodic basis even without any of the stages (e.g., initial configuration, phase I, or phase II) being triggered. Instead, generation of the baseline 705 may be triggered in response to another condition, such as a determined frequency or periodicity (e.g., perhaps the baseline 705 is recomputed every 3 months, 4, 5, 6, 7, 8, 9, 10, 11, 12 months, and so on). In some cases, the baseline generation may be triggered based on a detected change to the resource database (e.g., a category associated with a client may have changed a threshold amount thereby triggered re-computation of the baseline). In some cases, an identified market trend or change in the market (e.g., a threshold change in the stock market or an identified change to commerce availability or international trade) is detected and may be used to trigger renewed generation of the baseline 705.

In some cases, an upcoming deadline is used as the trigger to initiate the baseline. 705. For instance, suppose a contract is due to be renewed or expired within a certain number of months. A preestablished threshold may be set to trigger the computation of the baseline 705 a threshold number of months prior to the contract's deadline. By computing the baseline 705 before the contract expires, the client will be able to ensure continued access to the resource (e.g., by obtaining new terms with the existing supplier or by contracting with a new supplier to start immediately upon expiration of the existing contract). Accordingly, any number of different triggering conditions may be observed or tracked to determine when to recompute the baseline 705.

Subscription model 700 also shows how the baseline 705 may be periodically compared 710 against a service level agreement (SLA) 715, or any other billing document detailing the current terms, conditions, and prices of a client's resources. The baseline 705 compares the current performance requirements of the client against the actual costs or usage of the client; additionally, the baseline 705 may also include predictions regarding potential cost savings for the delineated resources listed in the baseline 705. By periodically comparing 710 the baseline 705 against the SLA 715, the embodiments are able to not only periodically identify upcoming potential cost savings, but they are also able to prepare the client to initiate a disruption for when the SLA 715 expires so as to attempt to obtain performance enhancements by performing the disclosed embodiments. For instance, the various different engines may be permitted to initiate data gathering earlier than originally scheduled based on the result of the comparison of the baseline 705 against the SLA 715.

As illustrated, the comparison process in FIG. 7 illustrates how any number of conditions may be identified, which conditions may trigger some subsequent action to be performed (e.g., it may trigger the initial configuration stage, or perhaps stage I or even stage II). These conditions include, but are not limited to, performance differences 720 (i.e. differences between actual usage and paid-for usage), a category change 725, or even a resource volume change 730 (e.g., a change in the volume of a resource used or not used by the client). The ellipsis 735 demonstrates how any other condition may be detected based on the comparison process.

Based on the results of the comparison process, the embodiments may then trigger a flag 740 to inform the client regarding the changed condition. In some instances, the flag 740 may operate as a periodic reminder regarding an upcoming resource expiration period and the potential opportunity to achieve performance enhancements by following the disclosed principles. Accordingly, the subscription model 700 may be beneficially used to help prepare clients for changes in certain detected conditions and/or to help prepare for the execution of the disclosed transactional flow. When the subscription model is used, the baseline is periodically compared against the current service level agreement to identify performance differences, and a flag may be triggered in response to the baseline being periodically compared against the current service level agreement. This periodic comparison may be performed in response to the detection of any type of change, including, but not limited to, changes to a specific category or changes to a volume of resources used.

Ad-Hoc Requests

Figure 8:
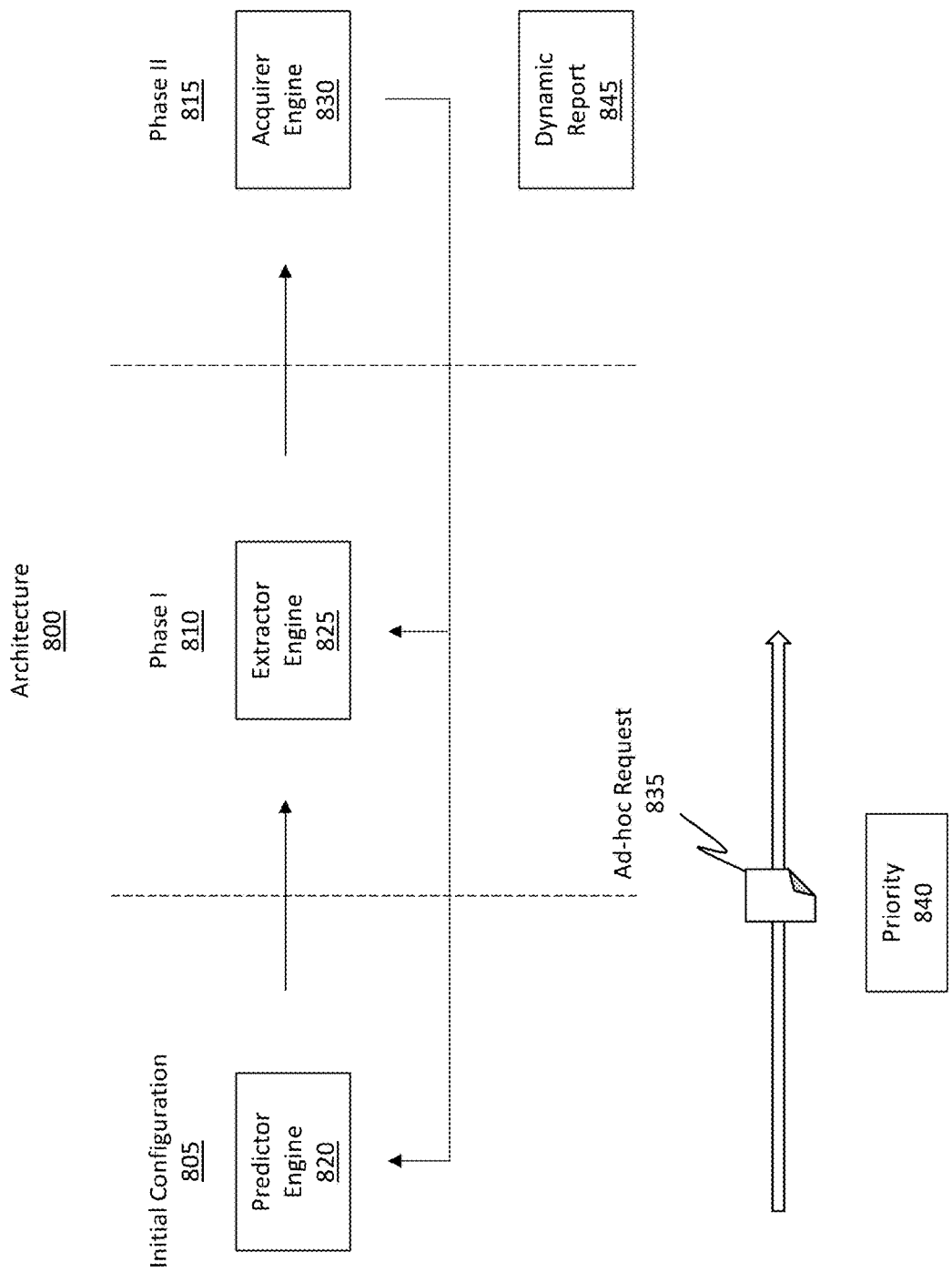
FIG. 8 illustrates how an ad-hoc request may be asynchronously injected into the transactional flow.

Often, clients are faced with unexpected changes in resource availability and require immediate or ready modifications to that resource or perhaps an unprecedented need for a new resource. The embodiments are able to handle asynchronous or "ad-hoc" requests to enable obtainment, replacement, or even renegotiation for a resource. FIG. 8 illustrates an example architecture 800, which is representative of the architectures discussed thus far, configured to handle any type of ad-hoc request. As shown, architecture 800 is shown as being able to perform operations across the different stages (e.g., initial configuration 805, phase I 810, and phase II 815), which correspond to the stages discussed earlier, using the different engines (e.g., predictor engine 820, extractor engine 825, and acquirer engine 830), which correspond to the engines discussed earlier.

At any point across any of the stages, the embodiments are able to receive a so-called ad-hoc request 835, which is a request that has been assigned a priority 840. It is often the case that priority 840 is higher or more pressing than priorities assigned to current workflows or current iterations of the methods. As such, ad-hoc request 835 is permitted to be executed before or ahead of other workflows even though those other workflows may have started before the receipt of the ad-hoc request 835. In some cases, computational resources are shifted from existing workflows to now being assigned to work or execute on the ad-hoc request 835.

Accordingly, an ad-hoc request may be received, and a specific reverse auction may be executed for the ad-hoc request. This specific reverse auction may be assigned a higher priority than the priorities of other reverse auctions such that one or more of those other reverse auctions may be temporarily delayed until the specific reverse auction is executed and/or completed. In some cases, the ad-hoc's reverse auction is executed during the same overlapping time period as when other reverse auctions are being executed.

It should be noted that the ad-hoc request 835 can be introduced into any of the stages and can preempt existing operations already existing in the stages. For example, the ad-hoc request 835 can preempt operations already occurring in the initial configuration 805, phase I 810, or even phase II 815. In some cases, the embodiments may refrain from performing a particular stage for the ad-hoc request 835 or may skip stages. For instance, instead of performing the initial configuration 805 for the ad-hoc request 835, the embodiments may determine that the priority 840 is sufficiently high so as to proceed immediately to phase I 810. The priority 840 and the characteristics associated with the ad-hoc request 835 may dictate which stage to begin at or which stages to skip.

Dynamic Reports

FIG. 8 also lists the option to provide a dynamic report 845, which may be based on the inventory (e.g., the rearranged inventory after categorization). As used herein, a dynamic report refers to a type of report in which any number of selectable variables included within the report (e.g., the predictions, costs, performance enhancements, supplier, resource, etc.) may be modified to select a new value for the variable or to replace the variable with another variable. Modifications to the variable then automatically trigger a re-computational process to perform updated analysis on how the modification will impact the results associated with the resource. For instance, suppose a performance requirement were modified in the baseline. By adjusting this variable (i.e. the performance requirement), the embodiments are able to automatically evaluate how that adjustment would impact the resulting resource. Of course, this is just one example, and the principles should be applied broadly. Any other variable may be modified to trigger commencement of a reevaluation to determine how the resource will be impacted based on the changed conditions. In this regard, the dynamic report 845 provides real-time evaluations for modifications to resource-related variables.

Practical Applications in Computing Technology

While a majority of the previous disclosure focused on some techniques involving entities that may be non-computer entities, it will be appreciated that the disclosed principles are also beneficial for application in many computing embodiments. For instance, the disclosed embodiments may be used by a computing system seeking to obtain improved performance or performance enhancements. In this regard, the disclosed principles may also be practically applied entirely within a computing environment.

Figure 9:
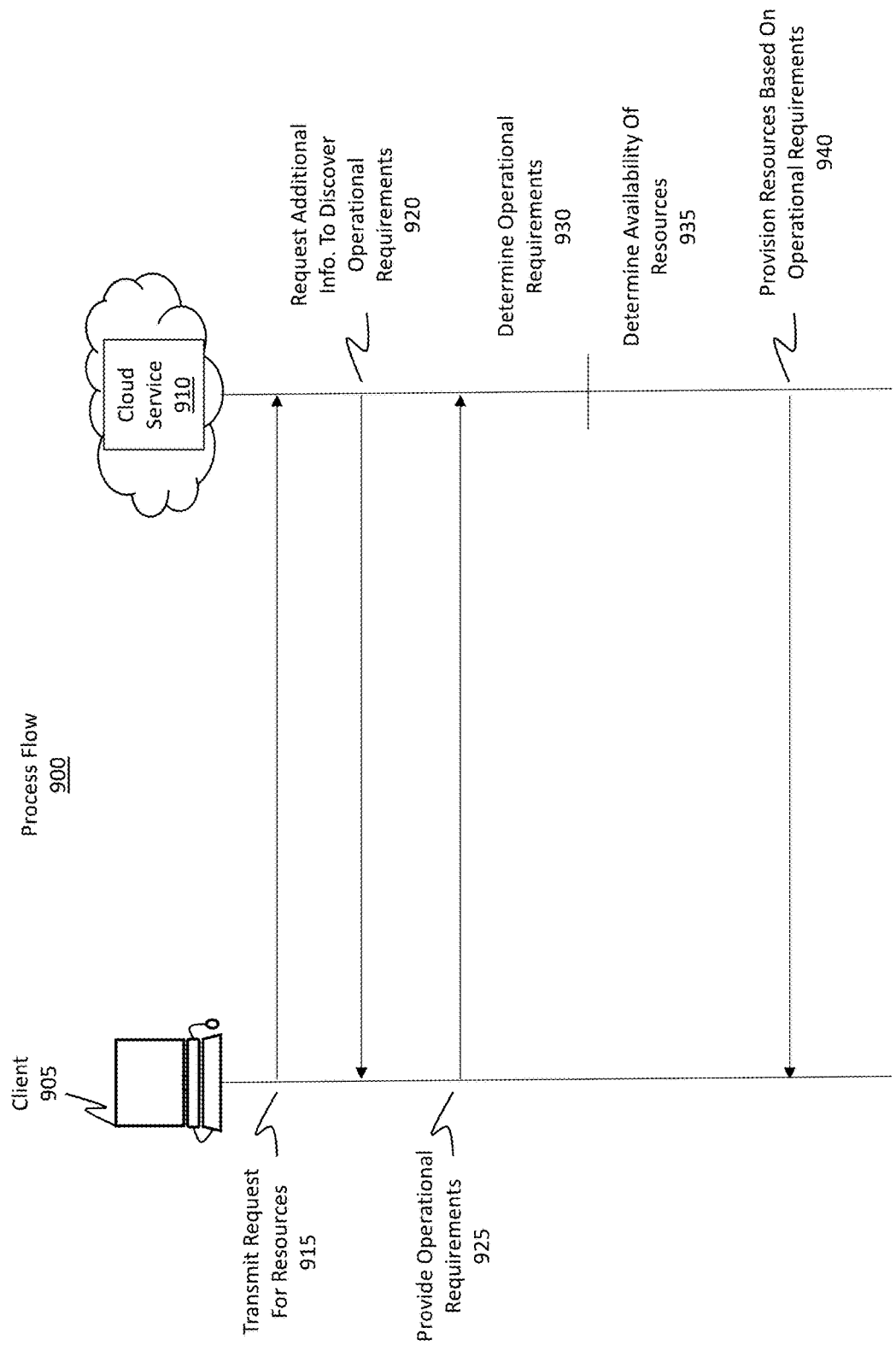
FIG. 9 illustrates aspects of the disclosed principles as applied in a practical computing environment application.

FIG. 9, for example, provides a useful and non-limiting illustration regarding a process flow 900 (or a transactional flow) that is performed to enable a computing system to obtain performance enhancements by generally following the principles disclosed herein.

FIG. 9 initially shows a client 905 computing device and a cloud service 910. The client 905 and the cloud service 910 are able to communicate over any type of network, such as a wired or a wireless network. In this example scenario, the client 905 is using a resource provided by the cloud service 910. An example of this resource may be storage capabilities of the cloud service 910. Additional examples of this resource include, but are not limited to, compute resources (e.g., processor time), SAAS resources, PAAS resources, IAAS resources, and so forth. The remaining examples will focus on a scenario involving the storage resource example.

Currently, a service level agreement exists between the client 905 and the cloud service 910 detailing aspects related to the storage functionality the cloud service 910 is providing. Additionally, in this scenario, the client 905 computing device has determined that a disruption to the storage capabilities is warranted in that the client 905 has determined that it needs additional storage capacity.

In response to this initial determination, the client 905 may transmit (915) a request for additional or modified resources (e.g., storage capabilities). This transmission may initiate the initial configuration stage mentioned throughout this disclosure.

The cloud service 910 receives the request and analyzes the request. In response, the cloud service 910 submits (920) its own request for additional information to discover additional operational requirements, similar to the data acquiring process described in method act 255 of method 250 in FIG. 2A. In other words, the cloud service 910 is requesting additional information in order to generate predictions regarding how much additional storage capacity is required by the client 905 and also regarding potential cost or computational savings the client 905 may realize.

The client 905 receives the cloud service 910's request and provides (925) the operational requirements. For instance, the client 905 transmits to the cloud service 910 logs, reports, documentation, contracts, usages, and other auditing documentation to the cloud service 910 to enable the cloud service 910 to identify resources used by the client 905 and to identify performance requirements. This transmission also operates as an indication that phase I of the process is to begin.

During phase I, the cloud service 910 now receives and processes the information from the client 905. In some cases, additional requests for information may be submitted by the cloud service 910 to the client 905 to obtain a more detailed description regarding the client 905's performance requirements.

The cloud service 910 then analyzes the received data and determines (930) or predicts the client 905's operational requirements, such as by categorizing the client 905's resources and generating a baseline, as described in FIG. 3A.

Phase II may then be triggered based on the generation of the baseline. Herein, the cloud service 910 determines (935) its availability to provide the requested resource. Additionally, the cloud service 910 may identity other cloud services capable of providing the requested service. The cloud service 910 then enables the client 905 to select from the available options. In response, the cloud service 910 then provisions (940) the selected resource(s) based on the operational requirements and based on the client 905's selection.

Accordingly, as shown by FIG. 9, the disclosed principles may also be likened with a computing scenario for obtaining computing resources.

Accordingly, the disclosed embodiments solve numerous problems in the technical field. By following the recited principles, the embodiments enable any type of client to achieve performance enhancements.

Example Computer/Computer Systems

Figure 10:
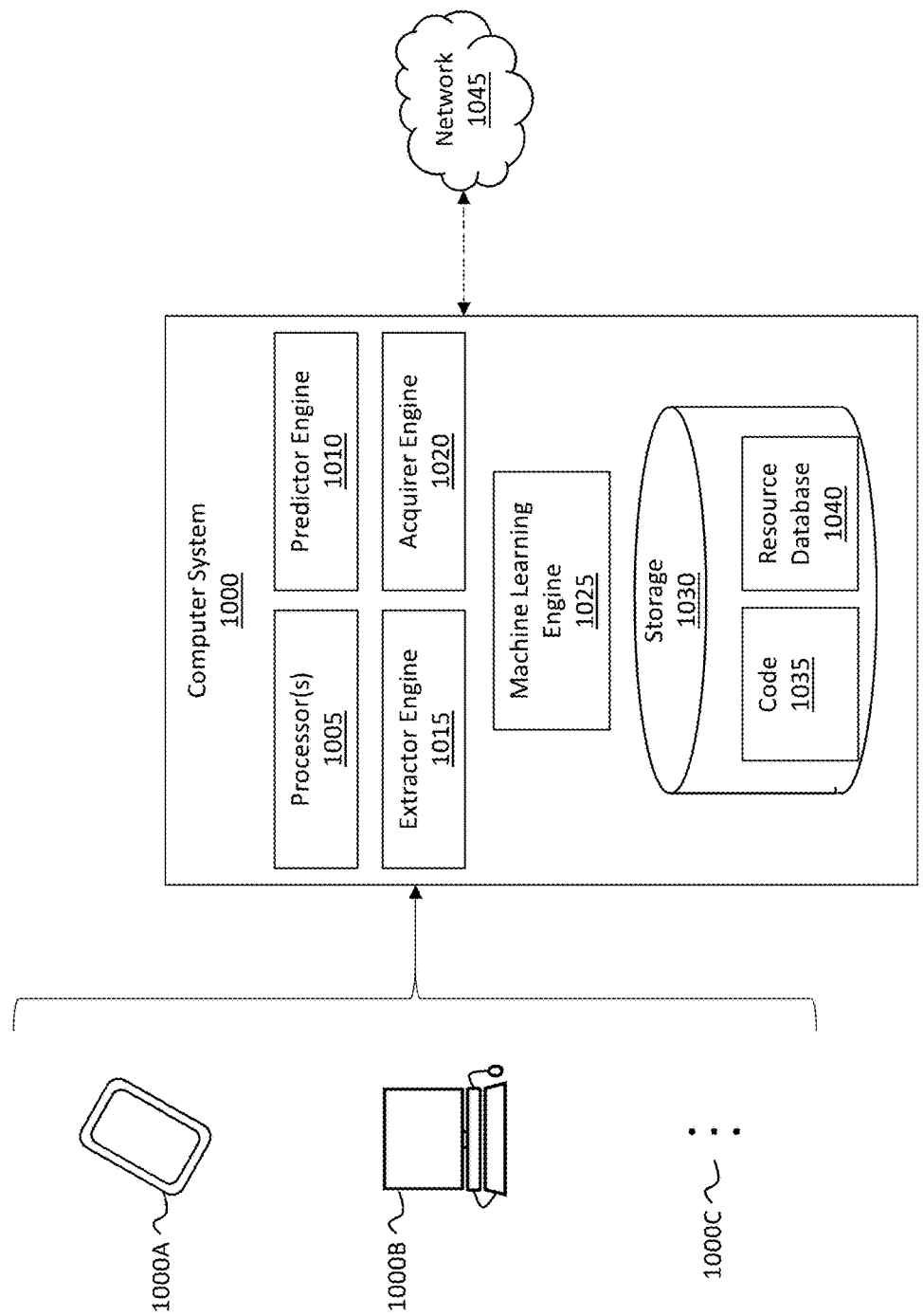
FIG. 10 illustrates an example computer system that includes and/or that is usable to implement aspects of the disclosed embodiments.

Attention will now be directed to FIG. 10 which illustrates an example computer system 1000 that may include and/or be used to perform any of the operations described herein. Computer system 1000 may take various different forms. For example, computer system 1000 may be embodied as a tablet (1000A), a desktop or laptop (1000B), a mobile device, or a standalone device, such as those described throughout this disclosure. The ellipsis 1000C shows how the computer system 1000 may be embodied in any form factor. Computer system 1000 may also be a distributed system that includes one or more connected computing components/devices that are in communication with computer system 1000. Computer system 1000 may also be a part of a cloud environment such that operations performed by computer system 1000 are cloud operations or cloud services.

In its most basic configuration, computer system 1000 includes various different components. FIG. 10 shows that computer system 1000 includes one or more processor(s) 1005 (aka a "hardware processing unit"), the predictor engine 1010, the extractor engine 1015, the acquirer engine 1020, the machine learning engine 1025 (these engines were discussed previously), and storage 1030.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The illustrated engines may be implemented as a specific processing unit (e.g., a dedicated processing unit as described earlier) configured to perform one or more specialized operations for the computer system 1000. As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

Storage 1030 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1030 is shown as including executable instructions (i.e. code 1035). The executable instructions represent instructions that are executable by the processor(s) 1005 (or perhaps even the engines) of computer system 1000 to perform the disclosed operations, such as those described in the various methods. Storage 1030 is also shown as including the resource database 1040, which is representative of the resource databases discussed thus far.

The disclosed embodiments may comprise or utilize a special-purpose or general-purpose computer including computer hardware, such as, for example, one or more processors (such as processor(s) 1005) and system memory (such as storage 1030), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors or devices via a network 1045. For example, computer system 1000 can communicate with any number devices (e.g., client devices) or cloud services to obtain or process data. In some cases, network 1045 may itself be a cloud network. Furthermore, computer system 1000 may also be connected through one or more wired or wireless networks 1045 to remote/separate computer systems(s) that are configured to perform any of the processing described with regard to computer system 1000.

A "network," like network 1045, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1045. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   a predictor engine configured to:
      obtain first resource data describing a first set of resources that were used over a first defined period of time;
      stack rank the first resource data based on an identified expenditure amount each resource in the first set of resources consumed;
      categorize each resource in the first set of resources to a particular category included within a plurality of categories to generate a category tree data structure describing characteristics of each resource in the first set of resources;
      for each one of at least some categories included in the plurality of categories, compile a corresponding list identifying a set of predicted performance enhancements that are potentially applicable to a corresponding resource associated with each one of the at least some categories; and
      generate a notification detailing the compiled list, which identifies the set of predicted performance enhancements;
   an extractor engine configured to perform the following based on a determination that the set of predicted performance enhancements satisfy a predetermined performance enhancement threshold:
      generate an inventory describing a second set of resources that were used over a second defined period of time;
      rearrange the inventory based on the plurality of categories; and
      use the rearranged inventory to generate a baseline, which contrasts performance requirements versus actual performance usage for each category in the plurality of categories; and
   an acquirer engine configured to perform the following based on a selection of a particular category included in the plurality of categories:
      select a particular resource to be used for the particular category, wherein selecting the particular resource is based on the baseline, a determined list of potential resources, and the performance requirements; and
      generate or modify an executable document based on the selected particular resource;
      the computer system being further configured to cause the predictor engine and the extractor engine to receive feedback from the acquirer engine and to perform machine learning on the received feedback to modify subsequent operations performed by the predictor engine and the extractor engine.

2. The computer system of claim 1, wherein the first defined period of time is 12 months, and wherein the first set of resources are selected based on metadata associated with the first set of resources, the metadata indicating that the first set of resources were used within the first defined period of time.

3. The computer system of claim 1, wherein the predicted performance enhancements identified within the compiled list includes a predicted minimum performance enhancement, a predicted maximum performance enhancement, and an average performance enhancement based on historical data collected for each one of the at least some categories.

4. The computer system of claim 1, wherein a resource database is maintained, the resource database detailing characteristics regarding each resource in the first set of resources and the second set of resources.

5. The computer system of claim 1, wherein a subscription model is provided, and wherein, when the subscription model is used, the baseline is periodically compared against a current service level agreement to identify performance differences, and wherein a flag is triggered in response to the baseline being periodically compared against the current service level agreement.

6. The computer system of claim 5, wherein periodically comparing the baseline against the current service level agreement is performed in response to detection of a change to a specific category included in the plurality of categories or in response to detection of a change to a volume of resources used.

7. The computer system of claim 1, wherein selecting the particular resource to be used for the particular category is performed using a reverse auction.

8. The computer system of claim 1, wherein the executable document is an existing document, and wherein the existing document is modified based on the selected particular resource.

9. A method for iteratively modifying how a resource is selected based on feedback acquired during one or more previous iterations in which a previous resource was selected, said method comprising:

obtaining first resource data describing a first set of resources that were used over a first defined period of time;

stack ranking the first resource data based on an identified expenditure amount each resource in the first set of resources consumed;

categorizing each resource in the first set of resources to a particular category included within a plurality of categories to generate a category tree data structure describing characteristics of each resource in the first set of resources;

for each one of at least some categories included in the plurality of categories, compiling a corresponding list identifying a set of predicted performance enhancements that are potentially applicable to a corresponding resource associated with each one of the at least some categories;

generating a notification detailing the compiled list, which identifies the set of predicted performance enhancements;

based on a determination that the set of predicted performance enhancements satisfy a predetermined performance enhancement threshold, generating an inventory describing a set of second resources that were used over a second defined period of time;

rearranging the inventory based on the plurality of categories;

using the rearranged inventory to generate a baseline, which contrasts performance requirements versus actual performance usage for each category in the plurality of categories;

based on a selection of a particular category included in the plurality of categories, initiating a reverse auction to select a particular resource to be used for the particular category, wherein the reverse auction relies on the baseline, a determined list of potential resources, and the performance requirements;

subsequent to completion of the reverse auction, selecting the particular resource to be used for the particular category;

generating or modifying an executable document based on the selected particular resource; and modifying how a subsequent iteration of said method is to be performed based on feedback collected during a current iteration or a previous iteration of said method.

10. The method of claim 9, wherein the executable document is a new document such that the new document is generated based on the selected particular resource.

11. The method of claim 9, wherein multiple categories, including said particular category, are selected, and wherein a corresponding reverse auction is executed for each one of said multiple categories.

12. The method of claim 11, wherein a first reverse auction, a second reverse auction, and a third reverse auction are executed, the second reverse auction being dependent on a result produced by the first reverse auction such that the second reverse auction executes subsequent in time to the first reverse auction, and wherein the third reverse auction executes during an overlapping time period with when the first reverse auction executes.

13. The method of claim 9, wherein an ad-hoc request is received to execute a specific reverse auction for the ad-hoc request, and wherein the specific reverse auction is assigned a higher priority than said reverse auction such that said reverse auction is temporarily delayed until the specific reverse auction is executed.

14. The method of claim 9, wherein an ad-hoc request is received to execute a specific reverse auction for the ad-hoc request, and wherein the specific reverse auction is executed during a same overlapping time period as when said reverse auction is executed.

15. The method of claim 9, wherein machine learning is used to generate the inventory describing the set of second resources that were used over the second defined period of time, the machine learning being one of:
a convolutional neural network,
a multilayer neural network,
a recursive neural network,
a deep neural network,
a decision tree model, including one or more of a decision tree, a random forest, or a gradient boosted tree,
a linear regression model,
a logistic regression model, or
a support vector machine.

16. The method of claim 9, wherein the method further includes generating a dynamic report based on the rearranged inventory.

17. The method of claim 9, wherein a subscription model is provided, and wherein, when the subscription model is used, the baseline is periodically compared against a current service level agreement to identify performance differences, and wherein a flag is triggered in response to the baseline being periodically compared against the current service level agreement.

18. The method of claim 9, wherein a resource database is maintained, the resource database detailing characteristics regarding each resource in the set of resources.

19. The method of claim 9, wherein the executable document is an existing document, and wherein the existing document is modified based on the selected particular resource.

* * * * *